US010521923B2

(12) United States Patent
Koga et al.

(10) Patent No.: US 10,521,923 B2
(45) Date of Patent: Dec. 31, 2019

(54) PART PROGRAM GENERATING DEVICE OF SURFACE TEXTURE MEASURING APPARATUS

(71) Applicant: MITUTOYO CORPORATION, Kanagawa (JP)

(72) Inventors: Tetsuya Koga, Miyazaki (JP); Tsukasa Kojima, Hokkaido (JP)

(73) Assignee: MITUTOYO CORPORATION, Kanagawa (JP)

( * ) Notice: Subject to any disclaimer, the term of this patent is extended or adjusted under 35 U.S.C. 154(b) by 129 days.

(21) Appl. No.: 15/457,005

(22) Filed: Mar. 13, 2017

(65) Prior Publication Data
US 2017/0270684 A1   Sep. 21, 2017

(30) Foreign Application Priority Data

Mar. 16, 2016  (JP) .................................. 2016-052043

(51) Int. Cl.
| *G06T 7/60* | (2017.01) |
| *G05B 19/4093* | (2006.01) |
| *G01B 11/24* | (2006.01) |
| *G01B 21/04* | (2006.01) |
| *G06T 7/40* | (2017.01) |

(Continued)

(52) U.S. Cl.
CPC ............ *G06T 7/60* (2013.01); *G01B 11/2441* (2013.01); *G01B 21/02* (2013.01); *G01B 21/04* (2013.01); *G01B 21/30* (2013.01); *G05B 19/4093* (2013.01); *G06F 3/04817* (2013.01);

(Continued)

(58) Field of Classification Search
CPC combination set(s) only.
See application file for complete search history.

(56) References Cited

U.S. PATENT DOCUMENTS 6,968,080 B2   11/2005   Takada et al.
8,538,165 B2    9/2013   Kojima et al.
(Continued)

FOREIGN PATENT DOCUMENTS

JP   3596753 B2   12/2004
JP   4812477 B2   11/2011
JP   4932202 B2    5/2012

OTHER PUBLICATIONS

U.S. Appl. No. 15/457,278 to Tetsuya Koga et al., filed Mar. 13, 2017.

*Primary Examiner* — Alexander Gee
(74) *Attorney, Agent, or Firm* — Greenblum & Bernstein, P.L.C.

(57) ABSTRACT

A part program generating device includes a CAD data memory storing CAD data of a work piece, a measurement condition definer receiving an input operation performed by a user and defining a measurement procedure, and a part program generator converting the measurement procedure defined by the measurement condition definer into a part program language. The measurement condition definer provides the user with, as a graphical user interface, an editing window capable of editing the measurement procedure in an editing language and a command icon providing a command to be used for defining the measurement procedure as an icon. The command icon includes a circumvention move command icon instructing to overcome a barrier when displacing a sensor from a start point to a target point.

16 Claims, 33 Drawing Sheets

(51) Int. Cl.
*G06F 3/0481* (2013.01)
*G01B 21/30* (2006.01)
*G01B 21/02* (2006.01)

(52) U.S. Cl.
CPC ............ *G06T 7/40* (2013.01); *G01B 2210/50* (2013.01); *G05B 2219/37573* (2013.01)

(56) References Cited

U.S. PATENT DOCUMENTS

| | | |
|---|---|---|
| 2001/0040995 A1 | 11/2001 | Takada et al. |
| 2003/0043267 A1* | 3/2003 | Matsumiya ............... F16P 7/00 348/86 |
| 2013/0123945 A1* | 5/2013 | Saylor ....................... G06F 8/30 700/17 |
| 2015/0151381 A1* | 6/2015 | Kurosawa ............ B23K 26/032 219/121.83 |
| 2016/0274773 A1 | 9/2016 | Koga |
| 2016/0346928 A1* | 12/2016 | Zhang ................... B25J 9/1679 |

\* cited by examiner

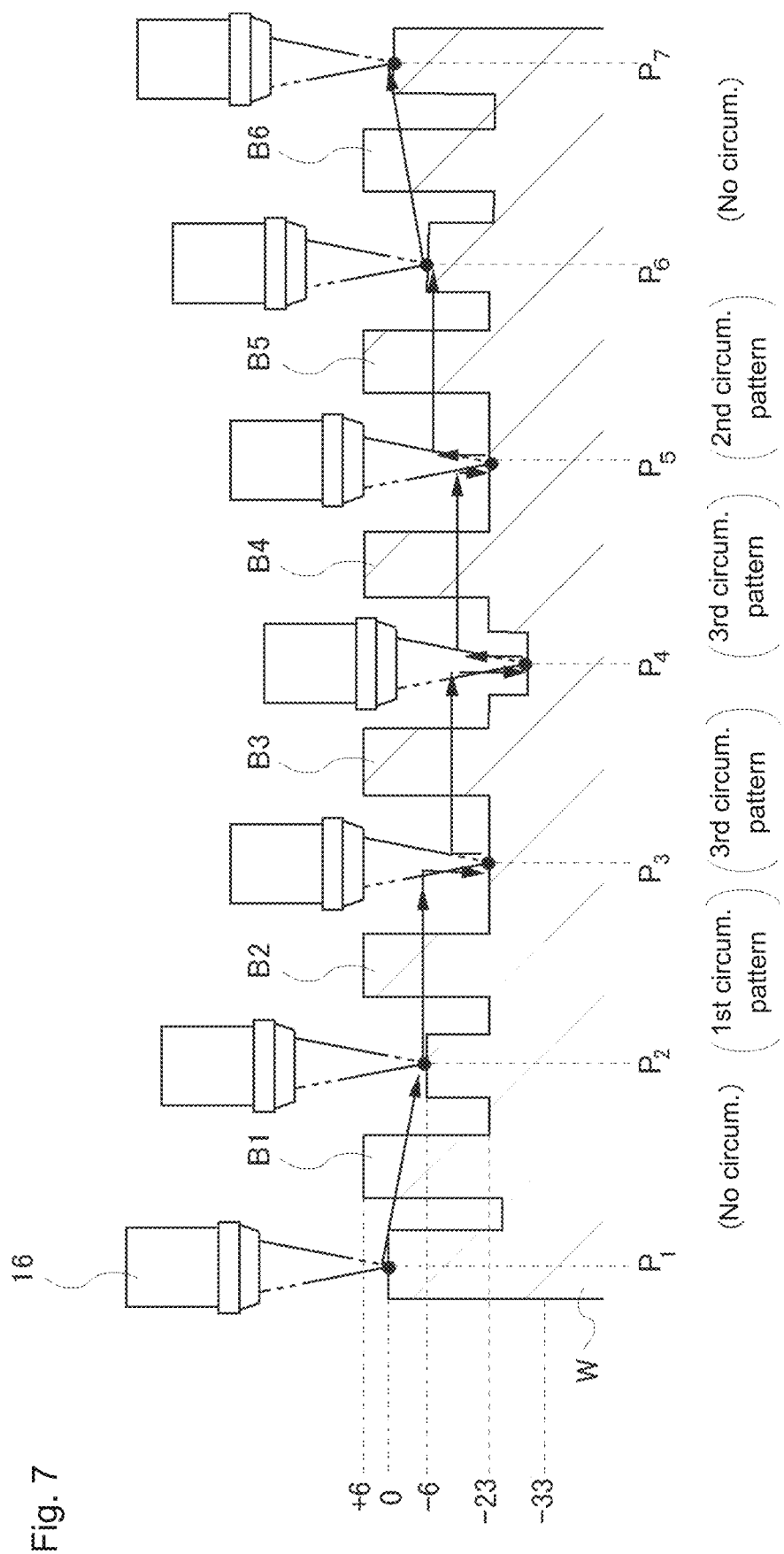

Fig. 8

Start measurement
Move cmd. $P_1$
  $X=x_1$, $Y=y_1$, $Z=0$
  Measurement 1

Circum. move cmd. $P_2$
  $X=x_2$, $Y=y_2$, $Z=-6$
  Barrier ht. $=6$
  Measurement 2

Circum. move cmd. $P_3$
  $X=x_3$, $Y=y_3$, $Z=-23$
  Barrier ht. $=6$
  Measurement 3

Circum. move cmd. $P_4$
  $X=x_4$, $Y=y_4$, $Z=-33$
  Barrier ht. $=6$
  Measurement 4

Circum. move cmd. $P_5$
  $X=x_5$, $Y=y_5$, $Z=-23$
  Barrier ht. $=6$
  Measurement 5

Circum. move cmd. $P_6$
  $X=x_6$, $Y=y_6$, $Z=-6$
  Barrier ht. $=6$
  Measurement 6

Circum. move cmd. $P_7$
  $X=x_7$, $Y=y_7$, $Z=0$
  Barrier ht. $=6$
  Measurement 7

.
  .
  .

(Part program generation)

Fig. 13

Start measurement
Move cmd. $P_1$
   $X=x_1$, $Y=y_1$, $Z=0$
   Measurement 1

Circum. move cmd. $P_2$
   $X=x_2$, $Y=y_2$, $Z=-6$
   Barrier ht. $=6$
   Measurement 2 move $P_2$
   $X=x_2$, $Y=y_2$, $Z=-6$

Circum. move cmd. $P_3$
   $X=x_3$, $Y=y_3$, $Z=-23$
   Barrier ht. $=6$
   Measurement 3

Circum. move cmd. $P_4$
   $X=x_4$, $Y=y_4$, $Z=-33$
   Barrier ht. $=6$
   Measurement 4

Circum. move cmd. $P_5$
   $X=x_5$, $Y=y_5$, $Z=-23$
   Barrier ht. $=6$
   Measurement 5

Start measurement

Move cmd. $P_1$
  $X=x_1, Y=y_1, Z=0$
  Measurement 1

Circum. move cmd. $P_2$
  $X=x_2, Y=y_2, Z=-6$
  Barrier ht. $=6$
  Measurement 2

Circum. move cmd. $P_3$
  $X=x_3, Y=y_3, Z=-23$
  Barrier ht. $=6$
  Measurement 3

Circum. move cmd. $P_4$
  $X=x_4, Y=y_4, Z=-33$
  Barrier ht. $=6$
  Measurement 4

Circum. move cmd. $P_5$
  $X=x_5, Y=y_5, Z=-23$
  Barrier ht. $=6$
  Measurement 5 move $P_{3-1}$
  $X=x_3, Y=y_3, Z=-6$ move $P_{3-2}$
  $X=x_3, Y=y_3, Z=-23$

Circum. move cmd. $P_4$
  $X=x_4$, $Y=y_4$, $Z=-33$
  Barrier ht. $=6$
  Measurement 4

Circum. move cmd. $P_5$
  $X=x_5$, $Y=y_5$, $Z=-23$
  Barrier ht. $=6$
  Measurement 5

Circum. move cmd. $P_6$
  $X=x_6$, $Y=y_6$, $Z=-6$
  Barrier ht. $=6$
  Measurement 6 move$P_{6-1}$
  $X=x_5$, $Y=y_5$, $Z=-6$ move$P_{6-2}$
  $X=x_6$, $Y=y_6$, $Z=-6$ Circum. move cmd. $P_7$
  $X=x_7$, $Y=y_7$, $Z=0$
  Barrier ht. $=6$
  Measurement 7

.
.
.
.
.

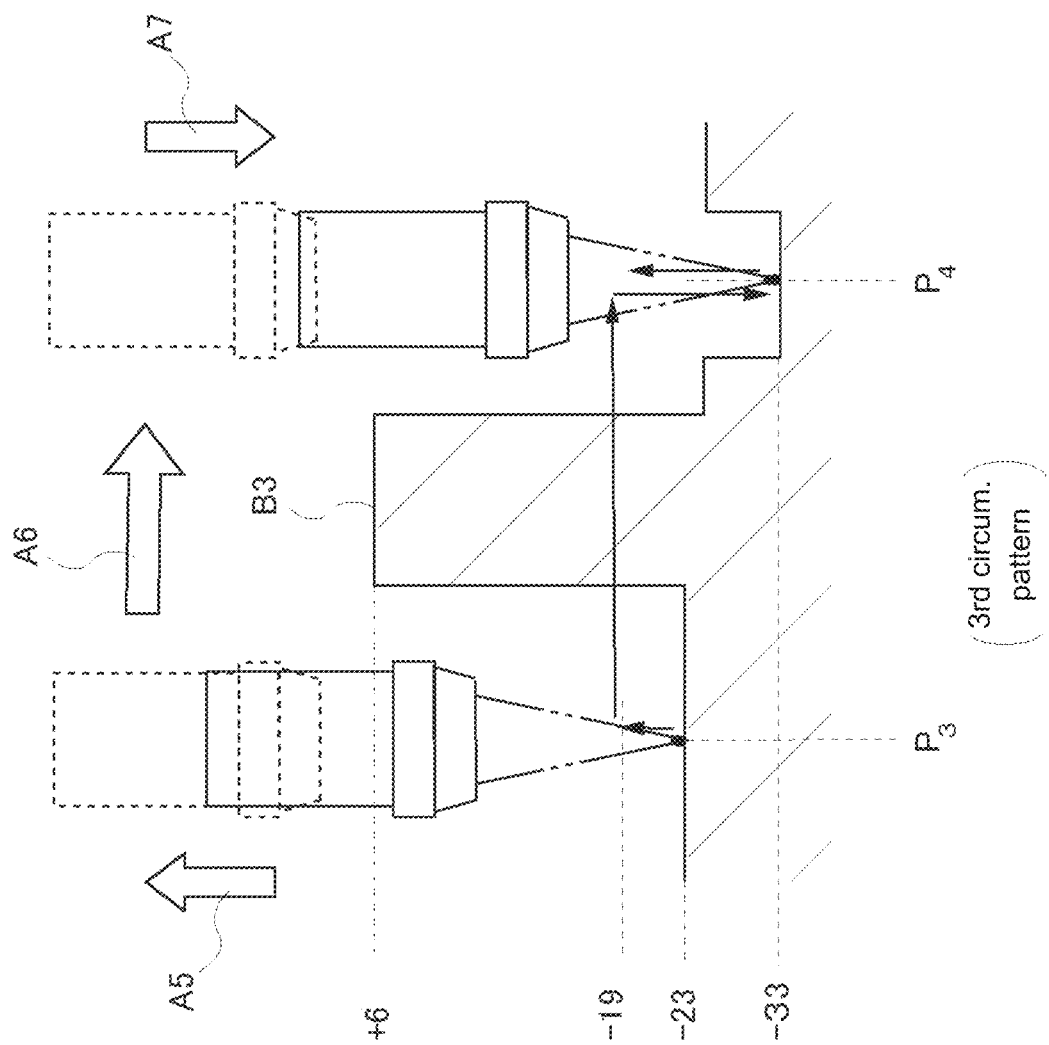

Fig. 19

Start measurement

Move cmd. $P_1$
  $X=x_1$, $Y=y_1$, $Z=0$
  Measurement 1

Circum. move cmd. $P_2$
  $X=x_2$, $Y=y_2$, $Z=-6$
  Barrier ht.$=6$
  Measurement 2

Circum. move cmd. $P_3$
  $X=x_3$, $Y=y_3$, $Z=-23$
  Barrier ht.$=6$
  Measurement 3

Circum. move cmd. $P_4$
  $X=x_4$, $Y=y_4$, $Z=-33$
  Barrier ht.$=6$
  Measurement 4

Circum. move cmd. $P_5$
  $X=x_5$, $Y=y_5$, $Z=-23$
  Barrier ht.$=6$
  Measurement 5

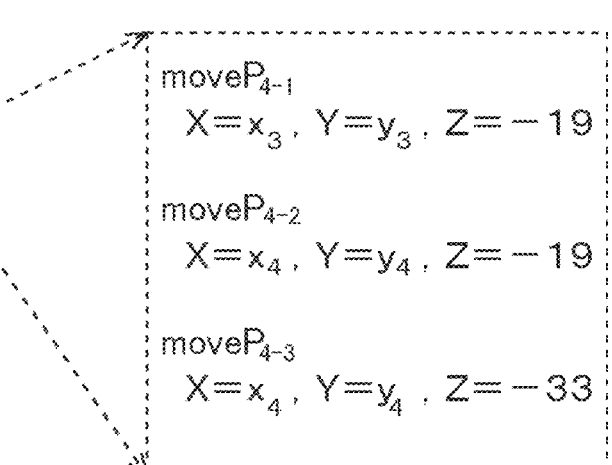

move$P_{4-1}$
  $X=x_3$, $Y=y_3$, $Z=-19$ move$P_{4-2}$
  $X=x_4$, $Y=y_4$, $Z=-19$ move$P_{4-3}$
  $X=x_4$, $Y=y_4$, $Z=-33$

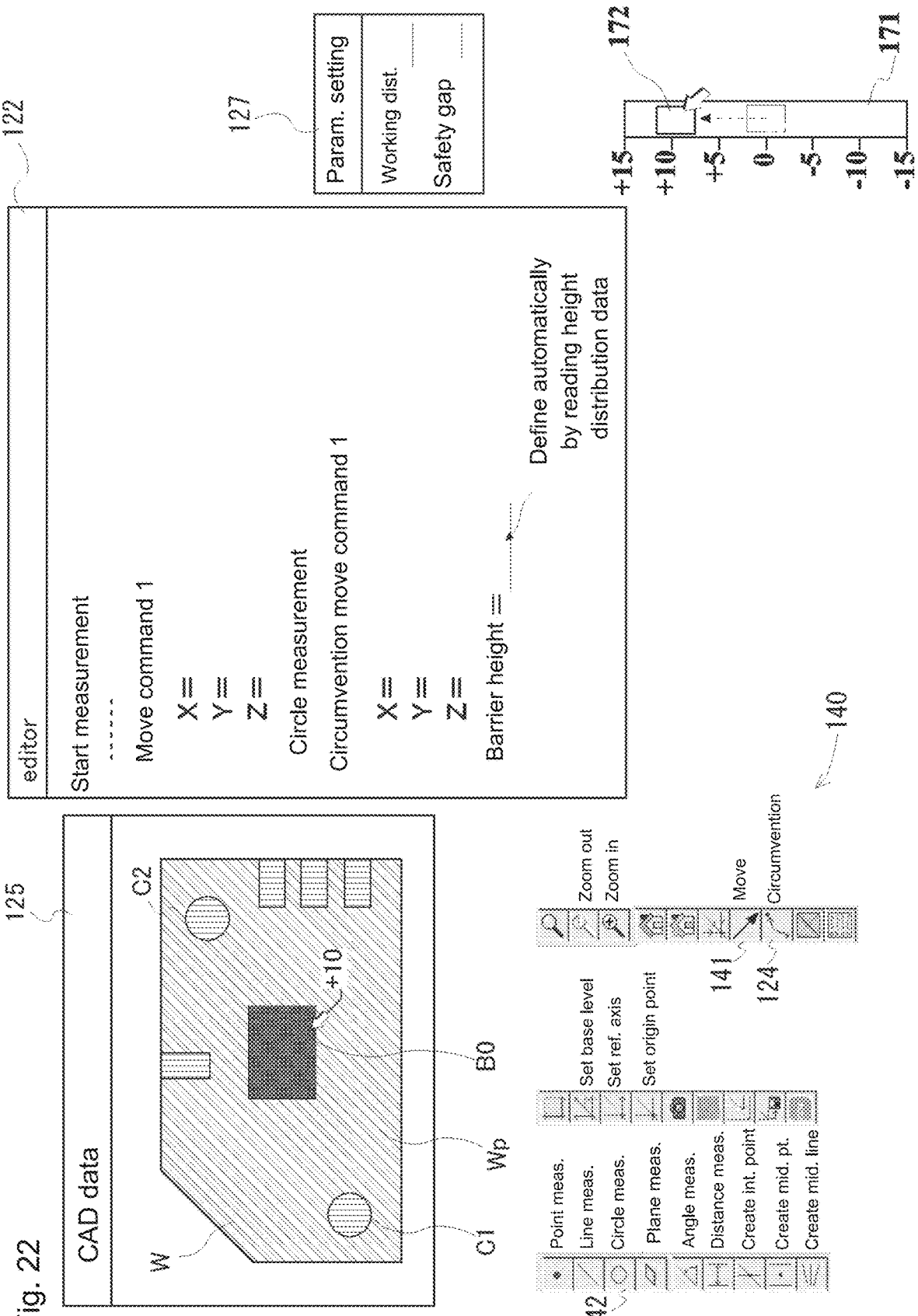

Fig. 23

```
Move command 1
 X=
 Y=
 Z=
Circle Measurement 1
 ┌─────────────────┐
 │Circum.move cmd. 1│
 │ X=x1            │
 │ Y=y1            │
 │ Z=z1            │
 │ Barrier ht.=hb1 │
 └─────────────────┘
Circle Measurement 2
 ....
 ┌─────────────────┐
 │Circum.move cmd. 2│
 │ X=x2            │
 │ Y=y2            │
 │ Z=z2            │
 │ Barrier ht.=hb2 │
 └─────────────────┘
Measurement
 ....
 ┌─────────────────┐
 │Circum.move cmd. 3│
 │ X=x3            │
 └─────────────────┘
```

161

```
┌─────────────────────────────────┐
│ ┌─────────────────────────────┐ │
│ │ SUBROUTINE                  │ │
│ │  circumvention              │ │
│ │  (X, Y, Z, H_B)             │ │
│ │  ....                       │ │
│ │ END SUBROUTINE              │ │
│ └─────────────────────────────┘ │
│                                 │
│ move1                           │
│  ......                         │
│ measurement circle 1            │
│  ......                         │
│ ┌─────────────────────────────┐ │
│ │CALL SUBROUTINE circumvention│ │
│ │ (x1, y1, z1, hb1)           │ │
│ └─────────────────────────────┘ │
│ measurement circle 2            │
│  ......                         │
│ ┌─────────────────────────────┐ │
│ │CALL SUBROUTINE circumvention│ │
│ │ (x2, y2, z2, hb2)           │ │
│ └─────────────────────────────┘ │
│ measurement                     │
│  ......                         │
│ ┌─────────────────────────────┐ │
│ │CALL SUBROUTINE circumvention│ │
│ │ (x3, y3, z3, hb3)           │ │
│ └─────────────────────────────┘ │
└─────────────────────────────────┘
```

(Part program generation)

Fig. 29

(Sixth modification)

Start measurement
Move cmd. $P_1$
 $X=x_1$, $Y=y_1$, $Z=0$
 Measurement 1

Circum. move cmd. $P_2$
 $X=x_2$, $Y=y_2$, $Z=-6$
 Barrier ht. $=6$
 Measurement 2

Circum. move cmd. $P_3$
 $X=x_3$, $Y=y_3$, $Z=-23$
 Barrier ht. $=6$
 Measurement 3

Circum. move cmd. $P_4$
 $X=x_4$, $Y=y_4$, $Z=-33$
 Barrier ht. $=6$
 Measurement 4

Circum. move cmd. $P_5$
 $X=x_5$, $Y=y_5$, $Z=-23$
 Barrier ht. $=6$
 Measurement 5 move $P_{3-1}$
 $X=x_3$, $Y=y_3$, $Z=\underline{-19}$ move $P_{3-2}$
 $X=x_3$, $Y=y_3$, $Z=-23$

Fig. 32

(Sixth modification)

⋮

Circum. move cmd. $P_4$
 $X=x_4$, $Y=y_4$, $Z=-33$
 Barrier ht.$=6$
Measurement 4

Circum. move cmd. $P_5$
 $X=x_5$, $Y=y_5$, $Z=-23$
 Barrier ht.$=6$
Measurement 5

Circum. move cmd. $P_6$
 $X=x_6$, $Y=y_6$, $Z=-6$
 Barrier ht.$=6$
Measurement 6

Circum. move cmd. $P_7$
 $X=x_7$, $Y=y_7$, $Z=0$
 Barrier ht.$=6$
Measurement 7 move$P_{6-1}$
 $X=x_5$, $Y=y_5$, $Z=\underline{-19}$ move$P_{6-2}$
 $X=x_6$, $Y=y_6$, $Z=-6$

⋮

PART PROGRAM GENERATING DEVICE OF SURFACE TEXTURE MEASURING APPARATUS

CROSS-REFERENCE TO RELATED APPLICATIONS

The present application claims priority under 35 U.S.C. § 119 of Japanese Application No. 2016-052043, filed on Mar. 16, 2016, the disclosure of which is expressly incorporated by reference herein in its entirety.

BACKGROUND OF THE INVENTION

1. Field of the Invention

The present invention relates to a part program generating device of a surface texture measuring apparatus. Specifically, the present invention relates to a device supporting creation of a part program which commands a measuring apparatus to perform a work piece measurement procedure when measuring a measured object (hereafter referred to as a work piece) with a surface texture measuring apparatus.

2. Description of Related Art

Conventionally, in an image measuring apparatus of a CNC (Computer Numerical Control) type, a part program having descriptions of a measurement condition of a work piece has generally been created using the following two methods. A first method is on-line teaching. In the on-line teaching, by placing the actual work piece on the measuring apparatus, the work piece is actually measured manually while the measurement procedure is stored in the image measuring apparatus. A second method is off-line teaching. In the off-line teaching, two-dimensional CAD data of the work piece is captured and displayed on a display, and the measurement procedure is programmed by typing in a command with an inputter (such as a mouse or a keyboard) while referring to the two-dimensional CAD data (see Japanese Patent No. 3596753 (issued Dec. 2, 2004), Japanese Patent No. 4812477 (issued Nov. 9, 2011), and Japanese Patent No. 4932202 (issued May 16, 2012), for example).

Creating a measuring part program with the off-line teaching is outlined below. FIG. 1 is an exemplary GUI (Graphical User Interface) screen 121 provided to a user in order to set up the measurement procedure (measurement condition) with the off-line teaching. FIG. 1 displays the CAD data of the work piece in an upper left corner window 125. In this example, a plan view of the work piece is displayed.

As an example, in the plan view of the work piece, a circle C1 is positioned in a lower left and a circle C2 is positioned in an upper right. The user performs a circle measurement of the circle C1 (such as measurement of a center and a diameter) followed by the circle measurement of the circle C2. In this case, the measurement procedure (measurement condition) is defined and entered such that a camera is displaced from a position immediately above the circle C1 to a position immediately above the circle C2. In the GUI screen 121, a command frequently used to define the measurement procedure (measurement condition) is provided as an icon 140. Further, the measurement procedure (measurement condition) defined and entered by the user is displayed clearly in an editing window 122.

The editing window 122 is clearly displayed in a language used in daily life (editing language), rather than in a professional programming language, and thus anybody can easily understand what the language communicates. While looking at the editing window 122, the user can readily perform editing tasks (such as insert, delete, and change) of the measurement procedure (measurement condition) in the middle of the procedure. The user enters the measurement procedure (measurement condition) by operating the provided command icon 140 using the mouse and by entering a numerical value using the keyboard.

When the user sets up the measurement procedure (measurement condition) in which the circle measurement of the circle C1 is performed, then the circle measurement of the circle C2 is performed, the following procedure is performed, for example. First, the user defines a move command 1 to displace the camera to a position immediately above the circle C1. The user clicks a move command icon 141, which is a command icon commanding displacement, and enters (center) coordinates (x1, y1, z1) of the circle C1 (destination). The user may type in the center coordinates of the circle C1 directly using the keyboard or the center of the circle may be automatically recognized from the CAD data by clicking a desired point on a circumference of the circle C1, for example. Thereafter, the user clicks a circle measurement command icon 142, which is the command icon for the circle measurement.

Next, the user defines a move command 2 to displace the camera to a position immediately above the circle C2. In other words, the user clicks the move command icon 141 and enters the center coordinates (x2, y2, z2) of the circle C2. Then, the user clicks the circle measurement command icon 142. In this way, the measurement procedure (measurement condition) is defined.

An image measuring system expands and converts the defined and entered measurement procedure (measurement condition) to the part program language which the image measuring apparatus can read and execute. By converting a set of commands of the measurement conditions defined in the editing language by the user to a set of commands in the part program language, a part program can be created in which the image measuring apparatus executes the measurement desired by the user. In this way, the part program is created by the off-line teaching using the two-dimensional CAD data. The measurement of the work piece is performed by reading and executing the part program with the image measuring apparatus. Specifically, after the circle measurement of the circle C1 is performed, the circle measurement of the circle C2 is performed by displacing the camera to the position immediately above the circle C2.

The two-dimensional CAD data, unlike three-dimensional CAD data, do not have three-dimensional information. Therefore, when the part program is created by the off-line teaching using the two-dimensional CAD data, the image measuring system cannot obtain information related to a three-dimensional shape of the work piece. Even with a step or a projection standing on a displacement path of the camera, the image measuring system cannot recognize the step or the projection, and naturally fails to perform an interference check automatically. When the image measuring apparatus executes the part program as is, as shown in FIG. 2 for example, a camera 16 may come into contact with a projection B0.

Conventionally, the image measuring apparatus has used a relatively flat measured object, and therefore, there was no concern that the camera 16 might touch a work piece W on the displacement path. However, a work piece having relatively large unevenness may need to be measured using the image measuring apparatus in the future, and this need must be addressed. Accordingly, a part program generating device of an image measuring apparatus is required which easily creates, in the off-line teaching using the two-dimensional CAD data, a part program avoiding the interference between the camera and the work piece.

SUMMARY OF THE INVENTION

A part program generating device according to the present invention includes a sensor measuring a work piece without contact, and generates a part program which is a control program of a surface texture measuring apparatus measuring a shape of the work piece while relatively displacing the sensor and the work piece. The part program generating device includes a measurement condition definer receiving an input operation performed by a user and defining a measurement procedure, and a part program generator converting the measurement procedure defined by the measurement condition definer into a part program language. The measurement condition definer provides the user with, as a user interface, an editor capable of editing the measurement procedure in an editing language and a set of commands in the editing language used to define the measurement procedure. The set of commands in the editing language includes a circumvention move command issuing a command to overcome an obstacle when the sensor is displaced from a start point to a target point.

In the present invention, preferably, the circumvention move command includes a parameter of an barrier height. When the circumvention move command is selected by the user, the measurement condition definer prompts the user to enter the barrier height.

In the present invention, preferably, the user enters a highest point height of the work piece, and when the user selects the circumvention move command icon, one of the measurement condition definer and the part program generator automatically defines the highest point height as the barrier height in displacing from the start point to the target point.

The present invention is further preferred to include a height distribution data memory storing height distribution data of the work piece.

In the present invention, preferably, the part program generator obtains coordinate values of the start point and coordinate values of the target point; obtains height data of the barrier, which is a projection or a step on the work piece and may prevent sensor displacement; configures a safety gap which should be secured between the sensor and the barrier when displacing the sensor above the barrier; calculates a safety height required for the sensor to overcome the barrier based on the barrier height, a working distance of the sensor, and the safety gap; and finds a safety path passing at least at the safety height above the barrier on the path from the start point to the target point based on the coordinate values of the start point, the coordinate values of the target point, and the safety height.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 7 illustrates an exemplary work piece;

FIG. 8 illustrates an exemplary measurement procedure created;

FIG. 13 illustrates an exemplary case where the measurement procedure is converted to the part program language;

FIG. 17 illustrates an exemplary case where the measurement procedure is converted to the part program language;

FIG. 18 is an enlarged diagram describing the displacement from a measurement point $P_3$ to a measurement point $P_4$;

FIG. 19 illustrates an exemplary case where the measurement procedure is converted to the part program language;

FIG. 22 illustrates an exemplary GUI screen provided to the user;

FIG. 23 illustrates an exemplary case where the measurement procedure is converted to the part program language;

FIG. 29 illustrates an exemplary case where the measurement procedure is converted to the part program language in the modification;

FIG. 32 illustrates an exemplary case where the measurement procedure is converted to the part program language in the modification.

DETAILED DESCRIPTION OF THE INVENTION

Figure 1:
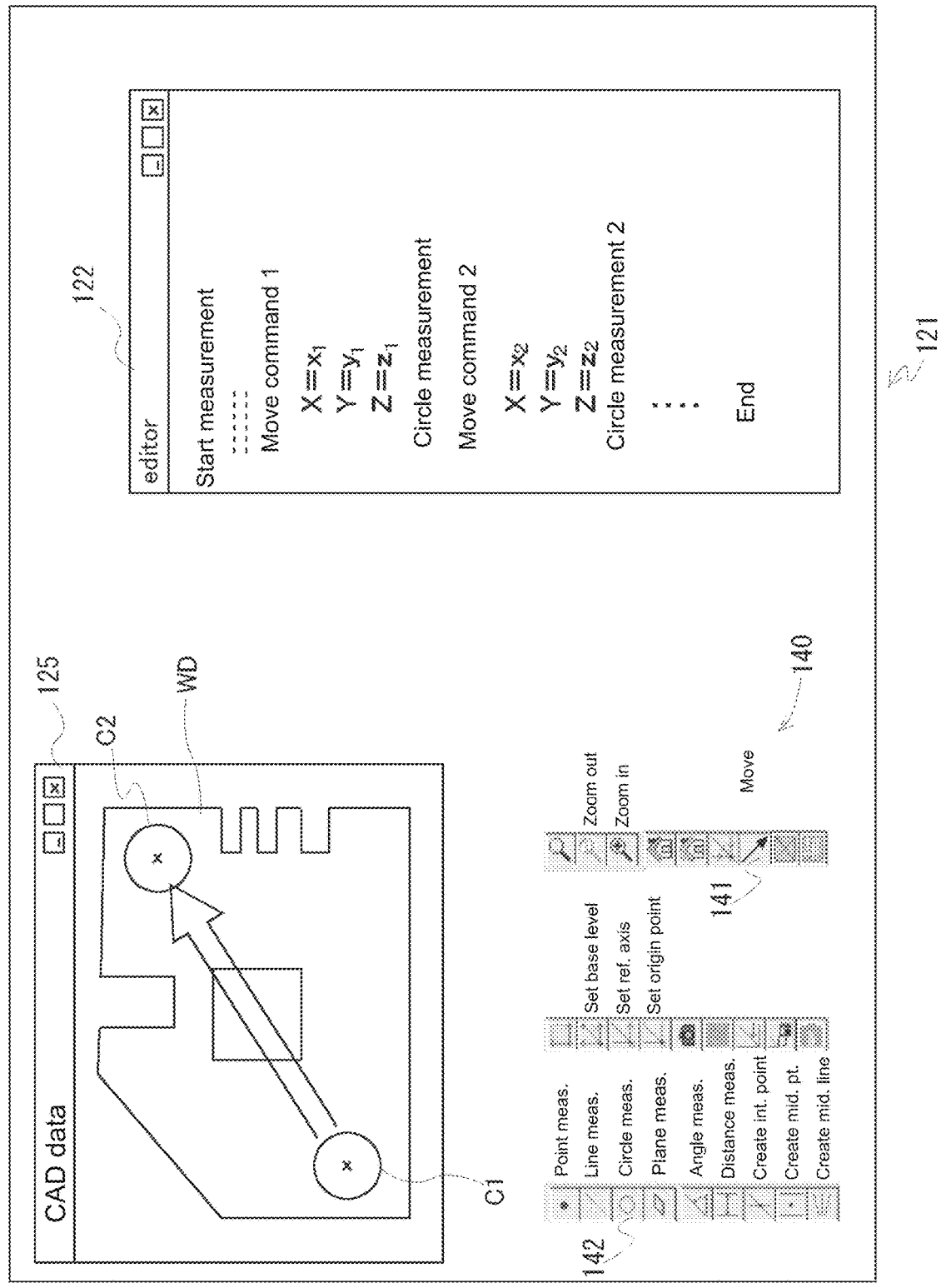
FIG. 1 illustrates an exemplary GUI screen provided to a user so as to set up a measurement procedure (measurement condition) with off-line teaching.
Figure 2:
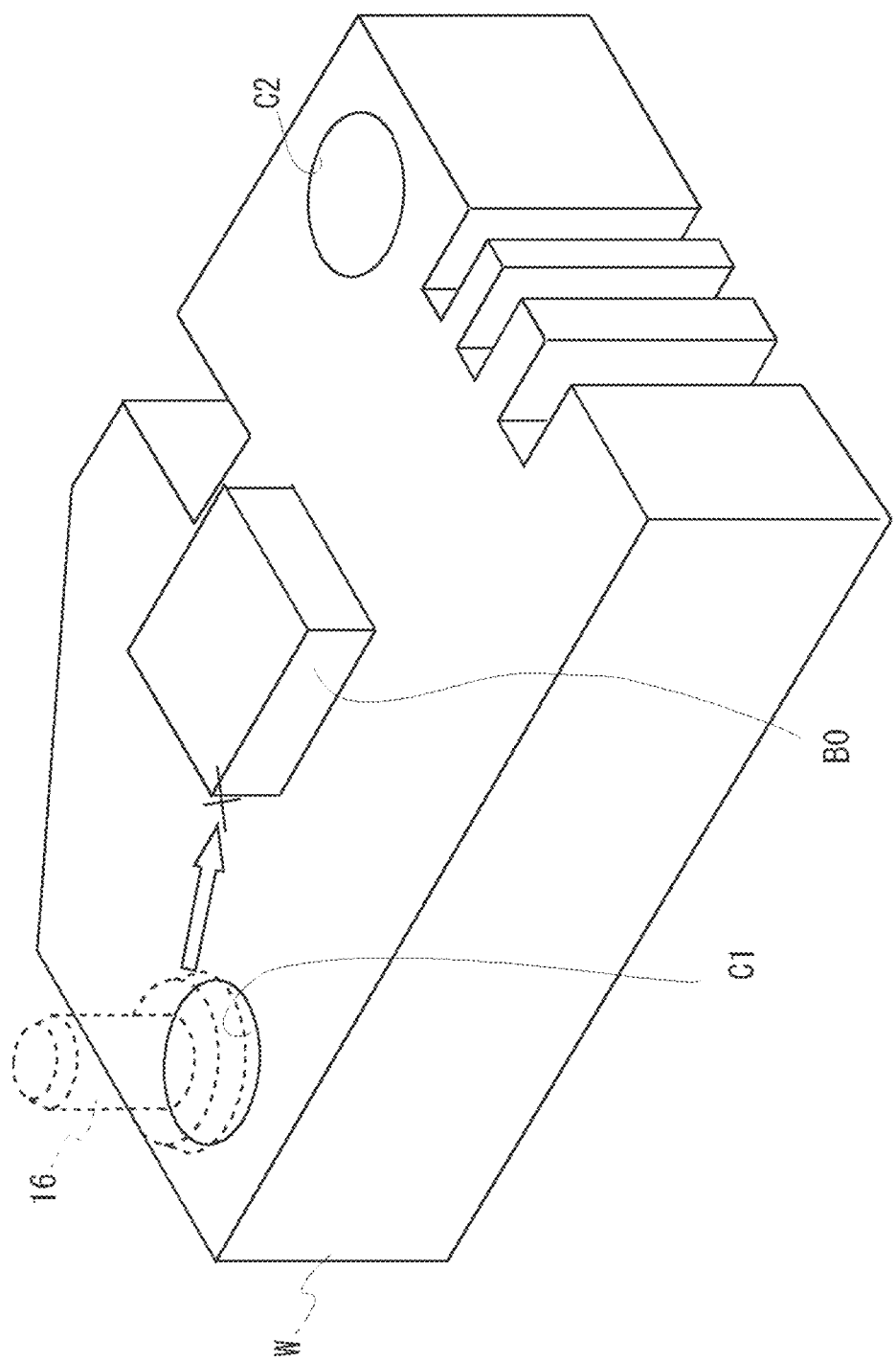
FIG. 2 illustrates an exemplary case where a camera is displaced.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A description of an embodiment of the present invention is given with reference to the drawings and to the reference numerals assigned to each component in the drawings.

First Embodiment

Figure 3:
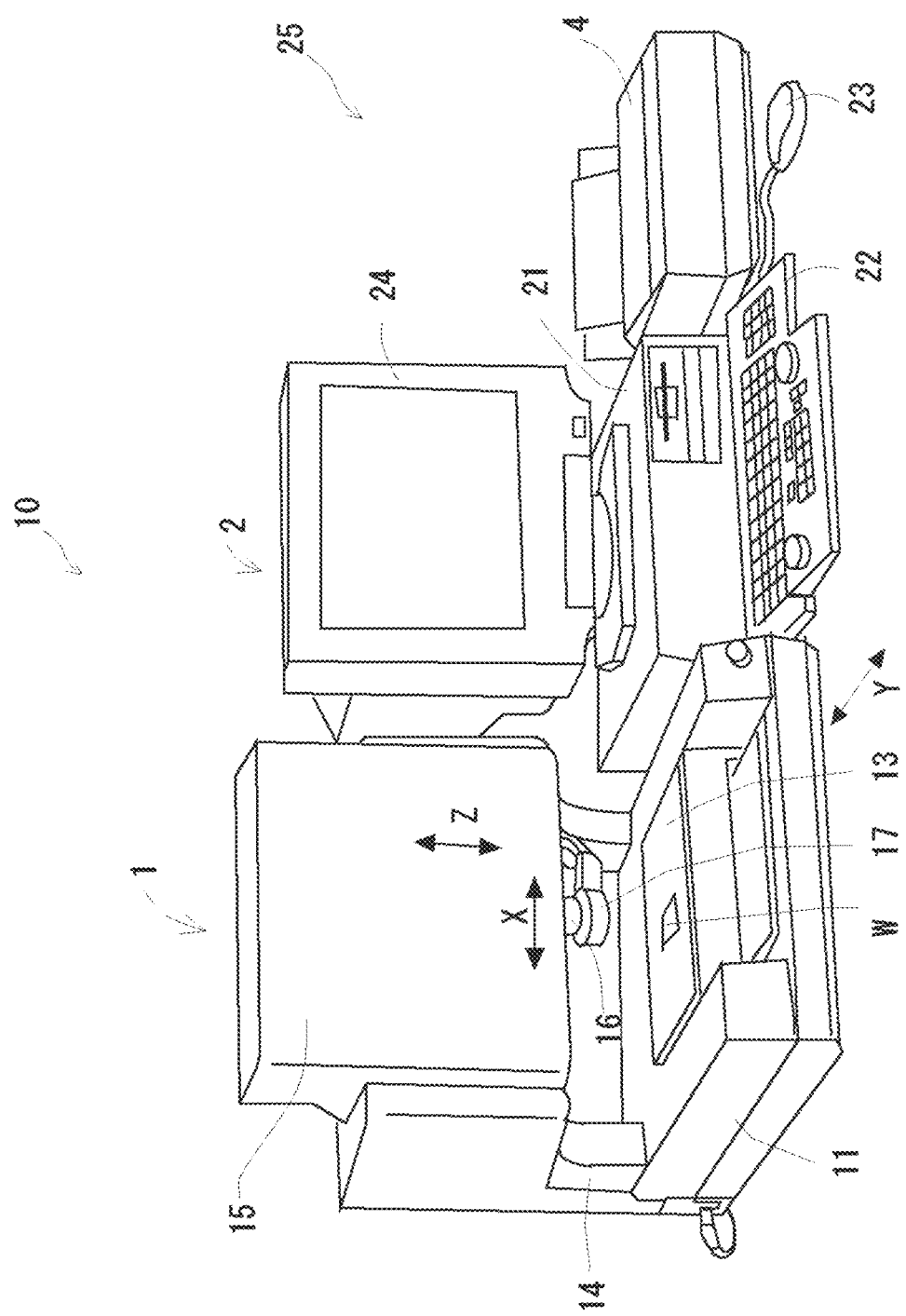
FIG. 3 illustrates an overall configuration of an image measuring system.

FIG. 3 illustrates an overall configuration of an image measuring system 10 as a surface texture measuring apparatus. The image measuring system 10 includes an image measuring apparatus 1 and a control computer 2 drive controlling the image measuring apparatus 1 and executing required data processing.

The image measuring apparatus 1 is configured as follows. A measurement table 13 is mounted on a stage 11, and a work piece W (measured object) is placed on the measurement table 13. The measurement table 13 is driven in a Y-axis direction by a Y-axis drive mechanism (not shown in the drawings). An upwardly-extending frame 14 is fixated to a back end portion of the stage 11. An X-axis drive mechanism and a Z-axis drive mechanism (neither shown in the drawings) are provided on an interior of a cover 15 projecting on a front surface from a top portion of the frame 14. A CCD camera (hereafter referred to as a "camera") 16 is supported by the X-axis drive mechanism and the Z-axis drive mechanism. The camera 16 is mounted so as to view the measurement table 13 from above. A ring-shaped illumination device 17 shining illuminating light on a work piece W is provided to a bottom end of the camera 16.

The control computer 2 includes a host computer 21 and an inputter/outputter 25. The inputter/outputter 25 includes a display 24, a keyboard 22, a mouse 23, and a printer 4. The display 24 may be a touch panel.

The host computer 21 is a so-called computer having a CPU and a memory. The host computer 21 performs drive control of the image measuring apparatus 1 in response to an input operation performed by the user. In addition, the host computer 21 executes processes such as shape analysis of the work piece (measured object) W by processing image data obtained by the camera 16. Further, the host computer 21 performs display control of the display 24 and provides the user with a graphical user interface. In the present embodiment, a part program generating method and a part program generating device using two-dimensional CAD data are described, however the host computer 21 is a part program generating device. Furthermore, the host computer 21 is a main "control device" controlling an operation of the image measuring apparatus 1.

Part Program Generating Device

Figure 4:
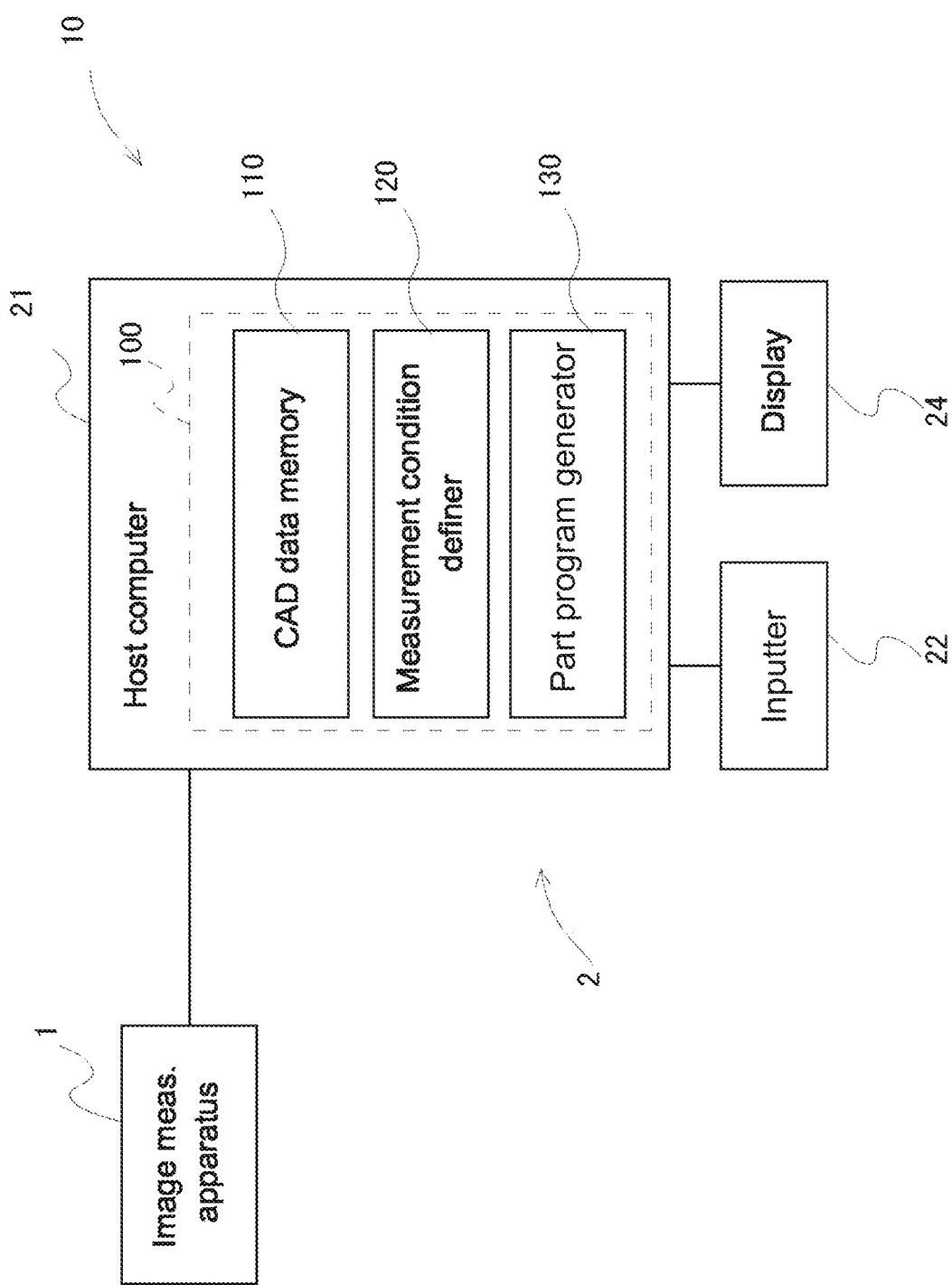
FIG. 4 is a functional block diagram of a part program generating device.

FIG. 4 is a functional block diagram of a part program generating device 100. The part program generating device 100 is realized by the CPU and a peripheral circuit (such as ROM and RAM) by loading a part program generating program to the CPU. The part program generating device 100 includes a CAD data memory 110, a measurement condition definer 120, and a part program generator 130.

The CAD data memory 110 is a memory storing the two-dimensional CAD data of the work piece.

Figure 5:
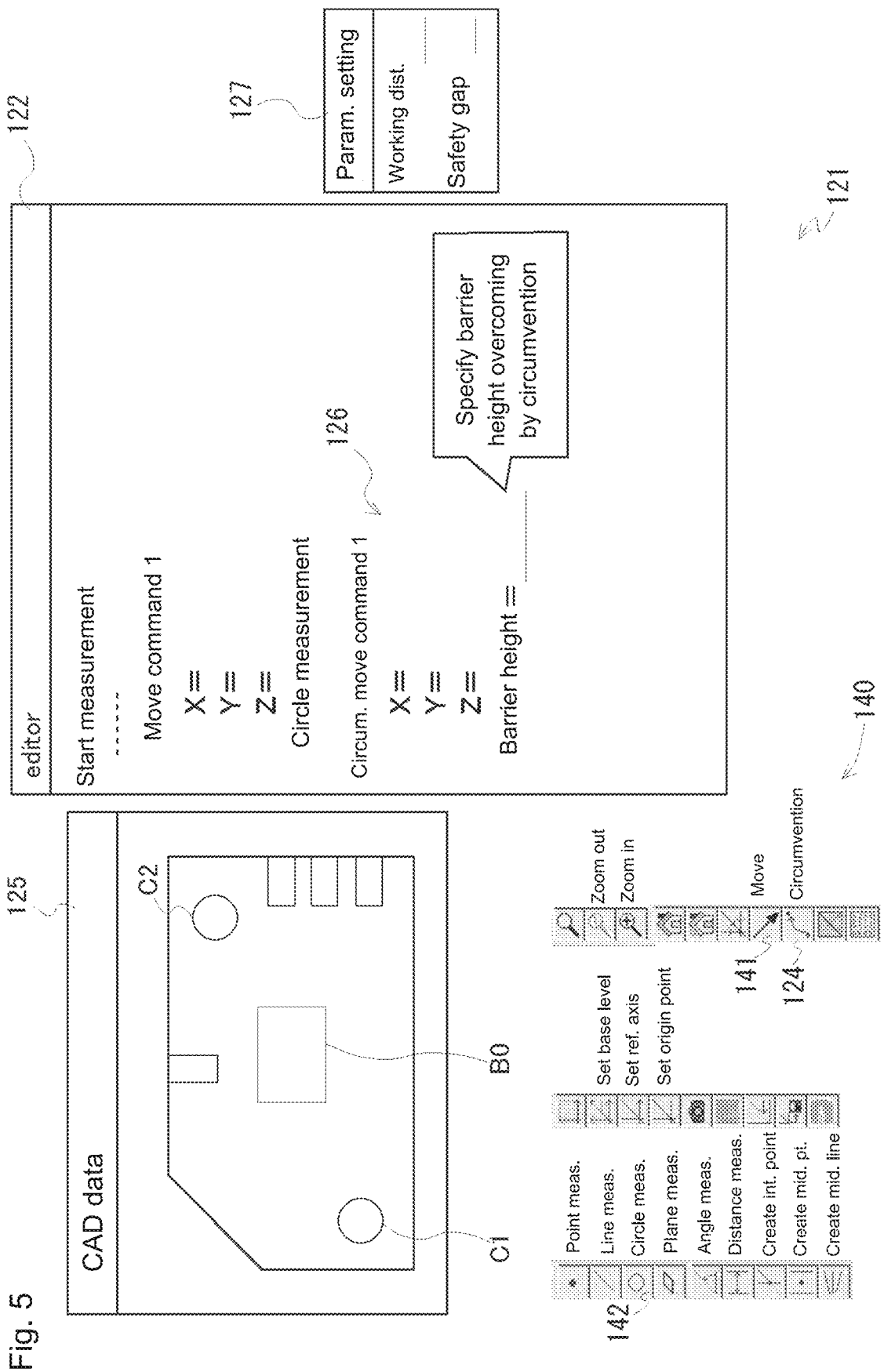
FIG. 5 illustrates an exemplary GUI screen provided to the user.

The measurement condition definer 120 provides the user with the GUI screen 121 shown in FIG. 5, for example, and defines the measurement procedure (measurement condition) after receiving an input operation performed by the user. The measurement condition definer 120 provides the user with an editing window 122 capable of editing the measurement condition in an understandable editing language instead of in commands of a professional programming. In addition, the measurement condition definer 120 provides the user a set of commands frequently used to define the measurement procedure (measurement condition) as command icons 140. In the present embodiment, as shown in FIG. 5, a circumvention move command icon 124 (command icon named "circumvention move") is newly created. Functions provided by the circumvention move command icon 124 are described later.

The CAD data of the work piece is displayed in a CAD data window 125 on an upper left in FIG. 5. In this example, a plan view of the work piece is displayed. As an example, a circle measurement of a circle C1 is performed, after which the camera 16 is displaced to a position immediately above a circle C2 and circle measurement of the circle C2 is performed. However, a projection B0 stands on a path connecting the circle C1 and the circle C2. In this case, the camera 16 may come into contact with the projection B0 during the displacement.

Figure 6:
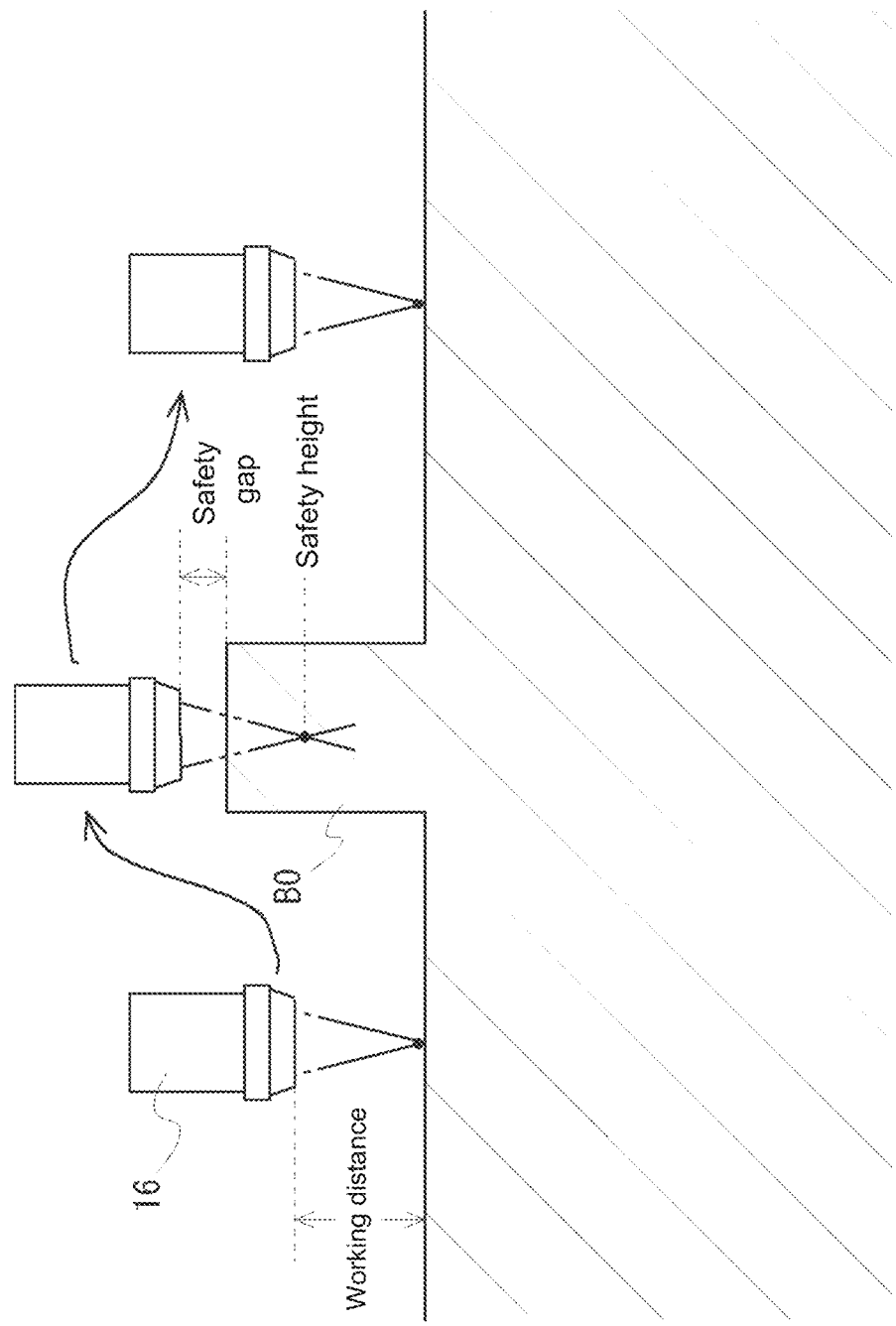
FIG. 6 illustrates an exemplary state where the camera circumvents a barrier.

Therefore, as shown in FIG. 6, the camera 16 needs to be displaced so as to circumvent the projection B0. With a combination of a plurality of "move" commands, it is theoretically possible to define a circumvention path. However, even with usage of the editing language, defining and entering such a circumvention path every single time requires a great deal of effort from the user.

In the present embodiment, the circumvention move command icon 124 is provided in the editing language of the measurement condition. When the camera 16 is displaced from a start point (origin of the displacement; circle C1) to a target point (destination; circle C2), the user defines a command using the circumvention move command icon 124 (the "circumvention move" command) when the user determines that the projection B0 stands in the middle of the path.

The user clicks the circumvention move command icon 124. A message 126 appears in the editing window 122 asking for the coordinate value of the destination and "barrier height" as required items to be entered for the circumvention move command. "The barrier height" in this example is a height of the projection B0. For example, the user may enter the height of the projection B0 by separately referring to the CAD data of a side view or a cross-sectional view instead of the plan view. After that, the part program having a path moving toward the destination while circumventing the projection B0 appropriately is generated automatically by a part program generating process described later.

In the GUI screen 121 in FIG. 5, a window 127 for setting a parameter is displayed. As the parameter, a working distance of the camera 16 and a safety gap are defined and entered.

The working distance of the camera 16 is a distance between a bottom end surface and a focal plane of the camera 16. See FIG. 6, for example. The working distance is a value determined by a type or a magnification of the camera 16 and therefore, the measurement condition definer 120 or the part program generator 130 may obtain the distance automatically. In this example, a camera 16 having a working distance of 30 mm is used.

The safety gap is a space to be secured between the bottom end of the camera 16 and the barrier when the camera 16 crosses over the barrier. The safety gap may be set at a value of several mm. A predetermined value may be set as a default or the user may enter and set any value. In this example, the safety gap is set at 5 mm.

In this way, the user defines the "circumvention move command" in the measurement condition definer 120. The circumvention move command is a new function, but, from the perspective of the user, the only difference with the existing move command is whether the user needs to enter the "barrier height."

In order to describe a displacement path of the camera 16 in more detail and comprehensively, the work piece W as shown in FIG. 7 is considered. Points $P_1$ to $P_7$ are measurement points. The camera 16 measures each of the measurement points ($P_1$ to $P_7$) while displacing from the point $P_1$ to the point $P_7$. There are projections between each of the measurement points. These projections are referred to as barriers B1 to B6.

Further, in order to describe more specifically, exemplary numerical values are defined. In FIG. 7, the height of the measurement point $P_1$ (Z coordinate value) is 0 (zero). All the heights (Z coordinate value) of the barriers B1 to B6 are defined as +6. The heights (Z coordinate value) of the measurement point $P_2$ to the measurement point $P_7$ are defined as −6, −23, −33, −23, −6, and 0, respectively.

When the measurement condition is entered using the circumvention move command icon 124 mentioned above, the measurement procedure as shown in FIG. 8 can be created easily. By using the circumvention move command icon 124, only the coordinates of the destination and the barrier heights standing on the way are entered. Furthermore, an X coordinate and a Y coordinate of the measurement point $P_1$ are defined as x1 and y1. Hereafter, the X coordinate and Y coordinate of the measurement points $P_2$ to $P_7$ are also indicated using the respective index in the same way. When a circumvention move from the measurement point $P_1$ to the measurement point $P_2$ is ordered, for example, the coordinate values (x2, y2, −6) of the measurement point $P_2$ (the destination) and the height (+6) of the barrier B1 standing on the way need to be entered as the circumvention move command $P_2$.

Figure 9:
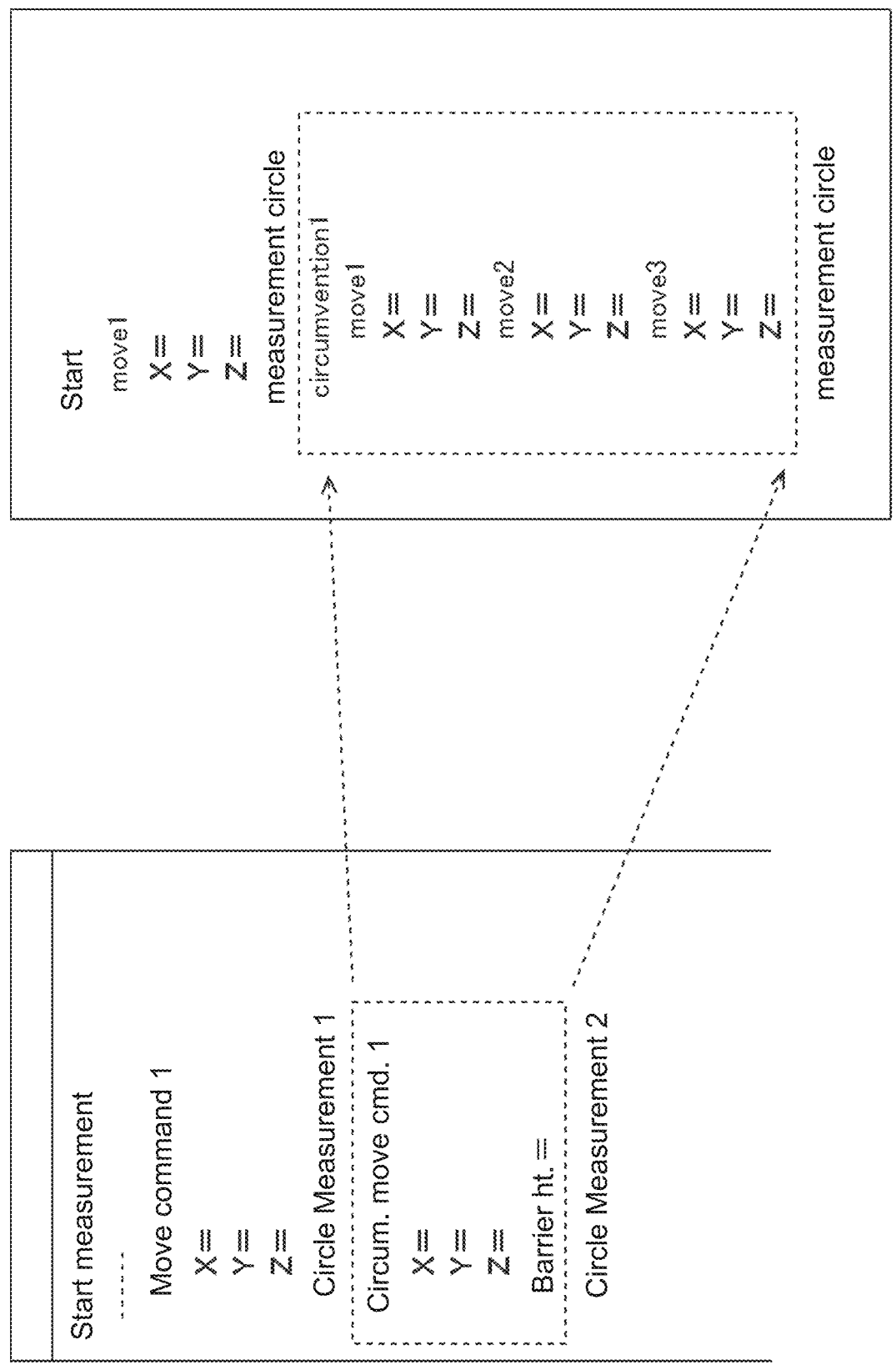
FIG. 9 illustrates an exemplary case where the measurement procedure is converted to a part program language.

The part program generator 130 expands and converts the measurement procedure (measurement condition) (FIG. 8) defined by the measurement condition definer 120 to the part program language (see FIG. 9). In other words, the set of commands in the editing language is converted to a set of commands in the part program language.

In the present embodiment, the circumvention move command icon 124, as the set of the "circumvention move" commands, is newly created in the editing language. In association with this, in the part program generator 130, the "circumvention move" command needs to be properly expanded and converted to the set of the commands in the part program language. This feature is described with reference to the flow charts in FIGS. 11, 12, and 16 and operation examples in FIGS. 10, 15, and 18.

Part Program Generating Method

Figure 11:
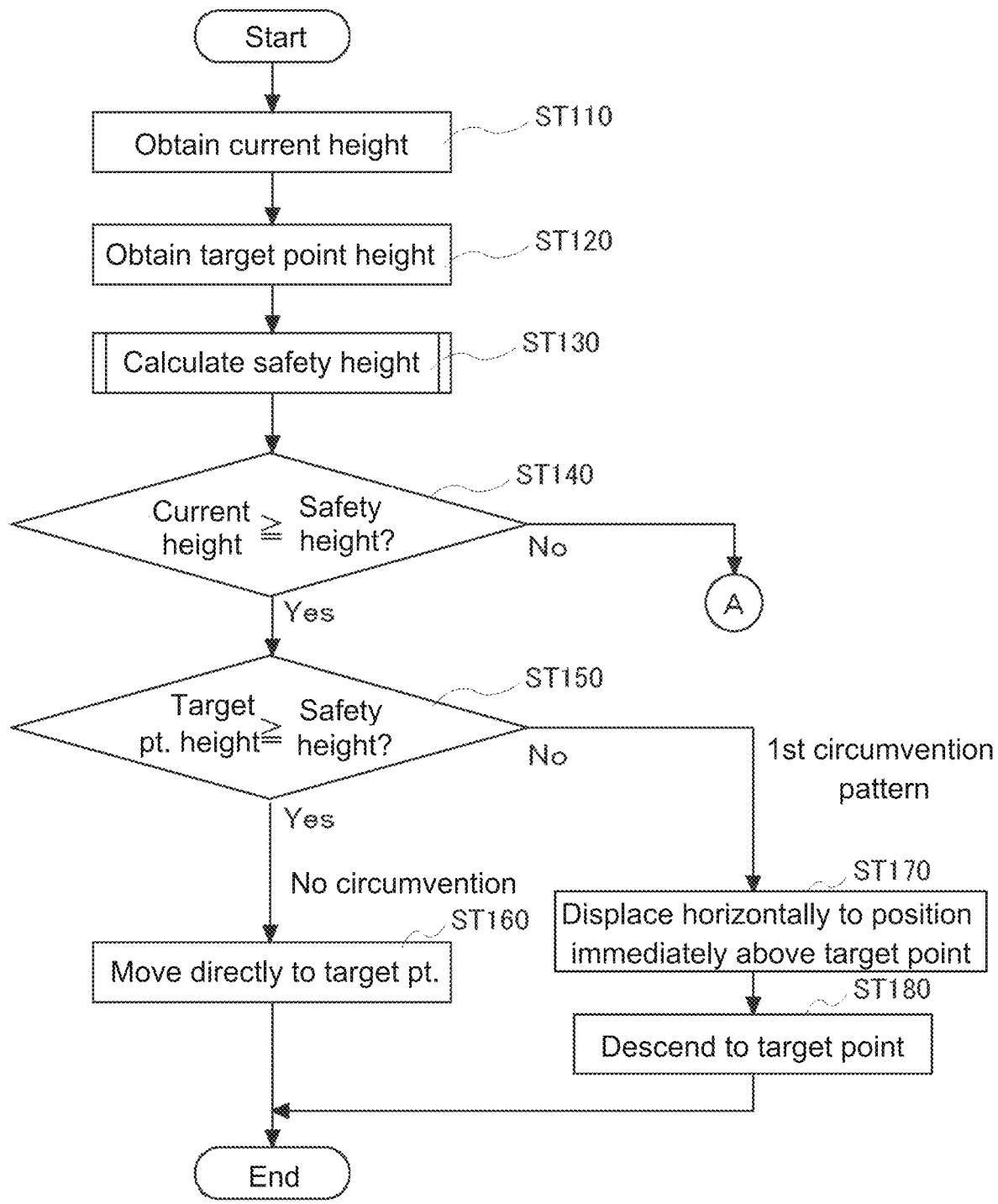
FIG. 11 is a flow chart describing a part program generating procedure.
Figure 12:
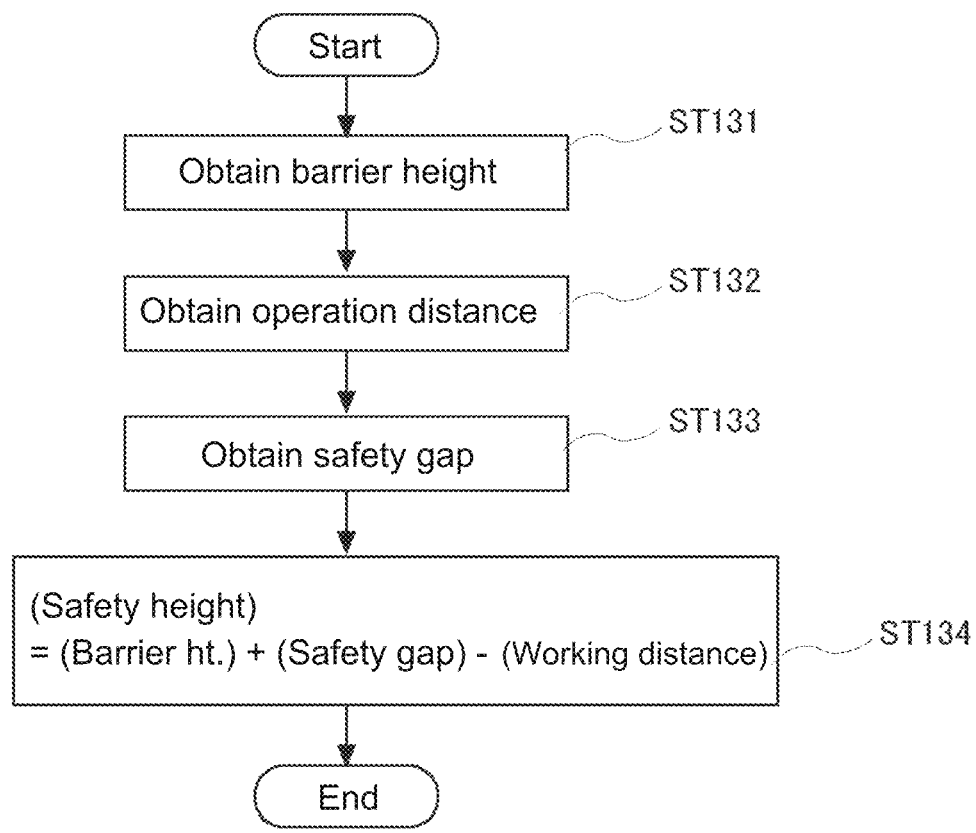
FIG. 12 is a flow chart describing a safety height calculation procedure.
Figure 16:
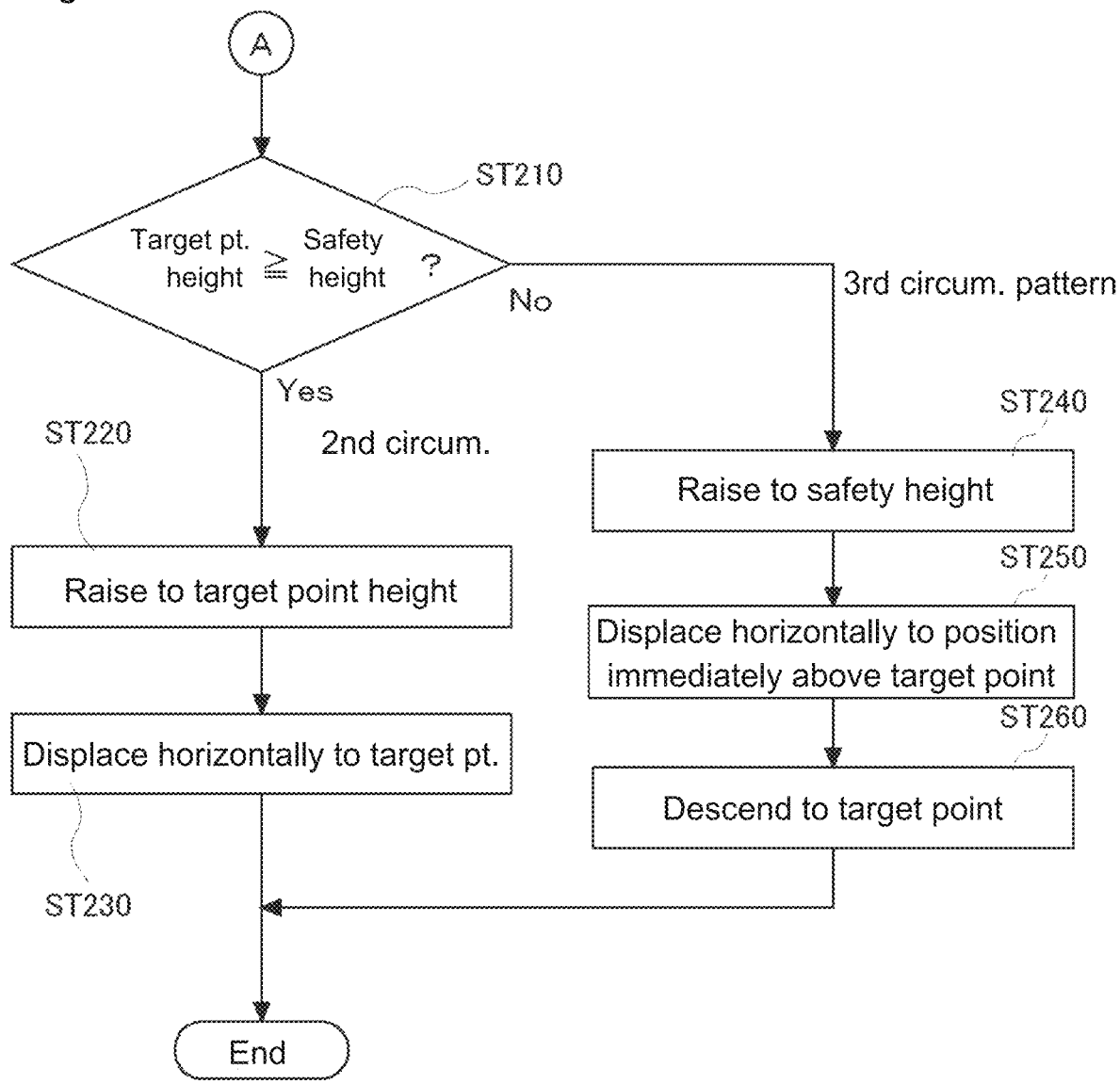
FIG. 16 is a flow chart describing the part program generating procedure.

The operation of the part program generator 130 is described in order with reference to the flow charts in FIGS. 11, 12, and 16. In principle, the set of commands in the editing language and the set of commands in the part program language correspond one to one. Put simply, various sets of commands in the editing language may be compiled in the part program language. However, when a new command is created such as the circumvention move command, the image measuring apparatus 1 has no ability to directly execute the circumvention move command and may not be able to compile the circumvention move command into a single command. In such a case, translation is required to achieve the intent of the circumvention move command with functions already included in the image measuring apparatus 1.

In the present embodiment, the operation in which the image measuring apparatus 1 executes the circumvention move command is indeed a feature of this invention. Thus, the process in which the circumvention move command defined by the measurement condition definer 120 is expanded to the part program is described as the operation of the part program generator 130.

When the camera 16 is displacing from a first measurement point (start point) to a second measurement point (target point), the camera 16 needs to displace without touching the barrier. Therefore, when displacing from measurement point to measurement point, the camera 16 takes a circumvention path as needed instead of displacing in a straight line (see arrows in FIG. 7). When displacing from measurement point to measurement point by crossing over a barrier, there are four displacement patterns (in other words: no circumvention, a first circumvention pattern, a second circumvention pattern, and a third circumvention pattern). These four displacement patterns are described respectively with reference to specific examples.

Displacement Pattern with No Circumvention

Figure 10:
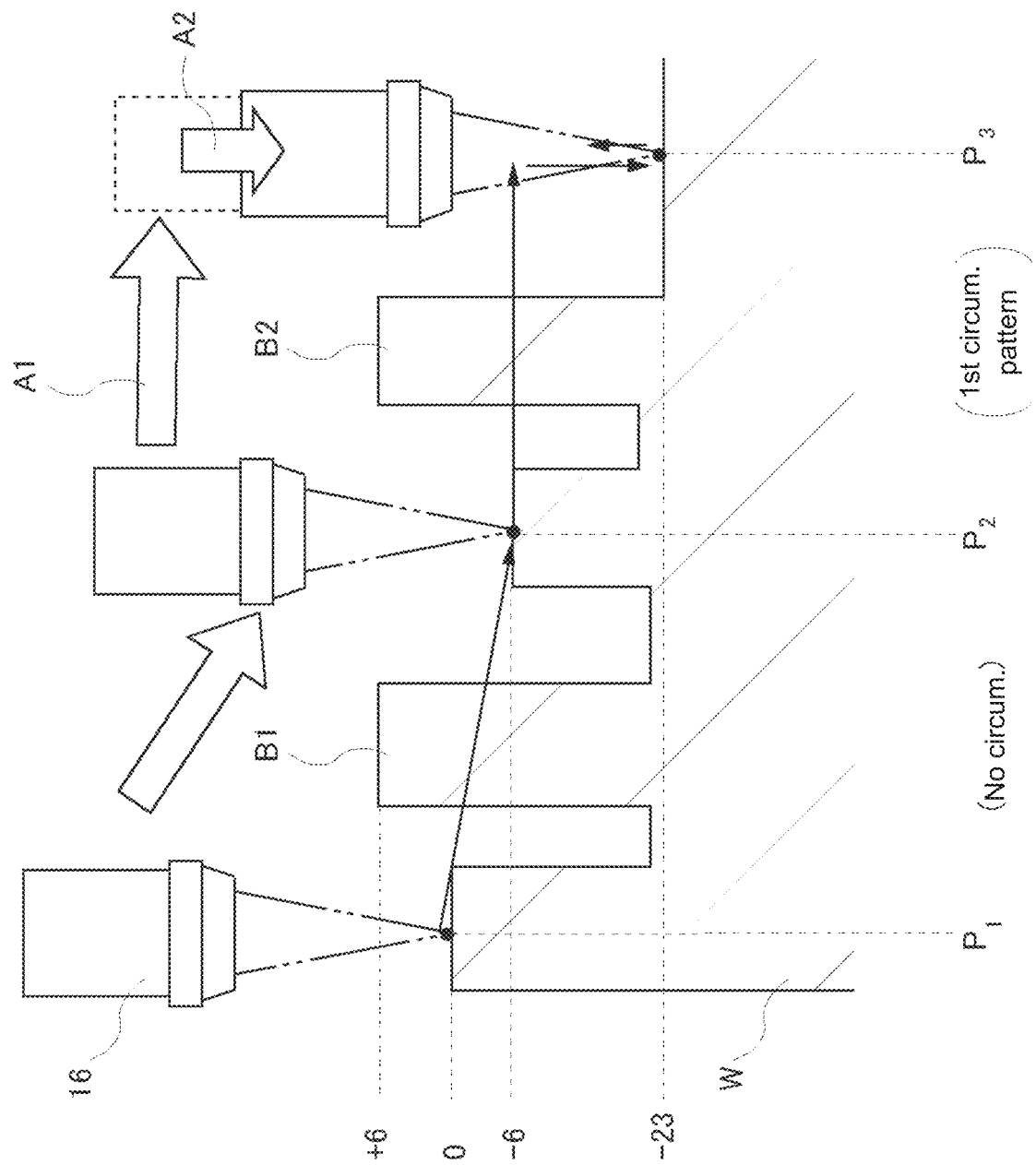
FIG. 10 is an enlarged diagram describing a displacement from a measurement point $P_1$ to a measurement point $P_2$.

Consider a case where the camera 16 is displaced from the measurement point $P_1$ to the measurement point $P_2$. In other words, the measurement point $P_1$ is the start point and the measurement point $P_2$ is the target point. FIG. 10 is an enlarged diagram describing the displacement from the measurement point $P_1$ to the measurement point $P_2$. In addition, discussion focuses on the circumvention move command $P_2$ of the measurement condition (measurement procedure) in FIG. 8.

As shown in the flow chart in FIG. 11, when the circumvention move command is expanded to the part program, the parts program generator 130 first obtains a "current height" of the camera 16 (ST110). In this example, "camera height" means a focal plane height of the camera 16. Further, "current height" is a height of the camera 16 at the time when the "circumvention move command $P_2$" starts executing. In other words, the current height is the height of the camera 16 at the time when a command immediately previous to the "circumvention move command" (measurement 1) ends.

The current height is obtained (ST110). The height of the measurement point $P_1$ is 0. In the measurement conditions (measurement procedure) in FIG. 8, the camera 16 reaches the measurement point $P_1$ in the displacement (move command $P_1$) immediately previous to the circumvention move command $P_2$, and therefore, the destination indicated by the move command $P_1$ may be read.

Next, the height of the target point is obtained (ST120). The target point refers to the destination and in this example, the target point is the measurement point $P_2$. The height of the measurement point $P_2$ is −6.

Then, the part program generator 130 calculates the "safety height" (ST130). The "safety height" in this example is the "focal plane height" required when the camera 16 clears the barrier B1 safely. With reference to FIG. 6, for example, when the camera 16 crosses over the barrier, the safety gap needs to be secured between the bottom end of the camera 16 and the barrier. Therefore, the focal plane height (i.e., safety height) required when the camera 16 crosses over the barrier safely is indicated below.

(Safety height)=(Barrier height)+(Safety gap)−(Working distance)

The flow chart in FIG. 12 shows the specific procedure of the safety height calculation (ST130). The barrier height (ST131), a working distance (ST132), and the safety gap (ST133) are obtained and the safety height is calculated in the formula above (ST134). In this example, the barrier height (ST131) is 6, the working distance (ST132) is 30, and the safety gap (ST133) is 5.

(Safety height) =
 (Barrier height) + (Safety gap) − (Working distance) = 6 + 5 − 30 = −19

The safety height is obtained in this way.

When the safety height (−19) is obtained, the "safety height" is then compared with the "current height" and "target height" (ST140 and ST150). In the example above, the "current height" (=0) and "target height" (=−6) are both higher than the "safety height" (=−19). In this case, when the camera 16 is displaced straight from the "current height" (=0) to the "target height" (=−6), the height of the camera 16 is not less than the "safety height" (=−19). Therefore, the part program generator 130 determines that circumvention is not necessary when expanding the circumvention move command $P_2$ (from the measurement point $P_1$ to the measurement point $P_2$) into the part program and converts the command $P_2$ as a simple move command without circumvention (see FIG. 13). Specifically, even when the circumvention move command $P_2$ is expanded into the part program, the command $P_2$ only becomes one move command (move$P_2$) displacing straight to the destination.

First Circumvention Pattern

Next, displacement from the measurement point $P_2$ to the measurement point $P_3$ is considered as an example where circumvention is required (FIGS. 7 and 10). The description focuses on a circumvention move command $P_3$ of the measurement condition (measurement procedure) in FIG. 8.

When the current height is obtained (ST110), the height of the measurement point $P_2$ is "−6." When the target point height is obtained (ST120), the height of the measurement point $P_3$ is "−23." When the safety height is calculated (ST130), the safety height is "−19" similar to the previous case since the height of the barrier B2 is +6 (ST131). The safety height (−19) is compared to the current height (−6) and the target point height (−23) (ST140 and ST150).

The comparison shows that the current height (−6) is more than the safety height (−19) (ST140: YES), but the target point height (−23) is less than the safety height (−19) (ST150: NO). Because the target point height (−23) is lower than the safety height (−19), the camera 16 may touch the barrier (B2) before reaching the target point when the camera 16 is displaced straight to the target point. In this case, the part program generator 130 selects the circumvention path of the first circumvention pattern when the circumvention move command of the measurement condition is expanded into the part program.

Figure 14:
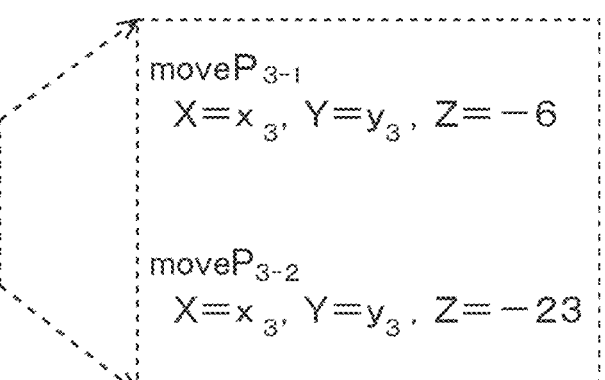
FIG. 14 illustrates an exemplary case where the measurement procedure is converted to the part program language.

In other words, the part program generator 130 expands the circumvention move command into two move commands (see FIG. 14). In the first circumvention pattern, as shown in the flow chart in FIG. 11, the camera 16 is first displaced to a position immediately above the target point (point $P_3$ in this example) by a horizontal displacement (ST170) (arrow A1 in FIG. 10). Then, the camera 16 is lowered to the target point height along a vertical direction (ST180) (arrow A2 in FIG. 10).

Because the "current height" (−6) is more than the safety height (−19), the camera 16 should be able to overcome the barrier (B2) safely with the horizontal displacement at the current height. Once the camera 16 has passed over the barrier safely with the horizontal displacement, the camera 16 may be displaced toward the target point. Even though the height of the barrier B2 (+6) is entered in the measurement condition, a detailed position (coordinates) of the barrier B2 is not entered. When the camera 16 is displaced to the position immediately above the target point (measurement point $P_3$), the camera 16 can be said to have definitely passed the barrier B2. Therefore, after the camera 16 is horizontally displaced to the position immediately above the target point (ST170), the path on which the camera 16 is lowered toward the target point (ST180) is an optimum path to secure safety.

Second Circumvention Pattern

Figure 15:
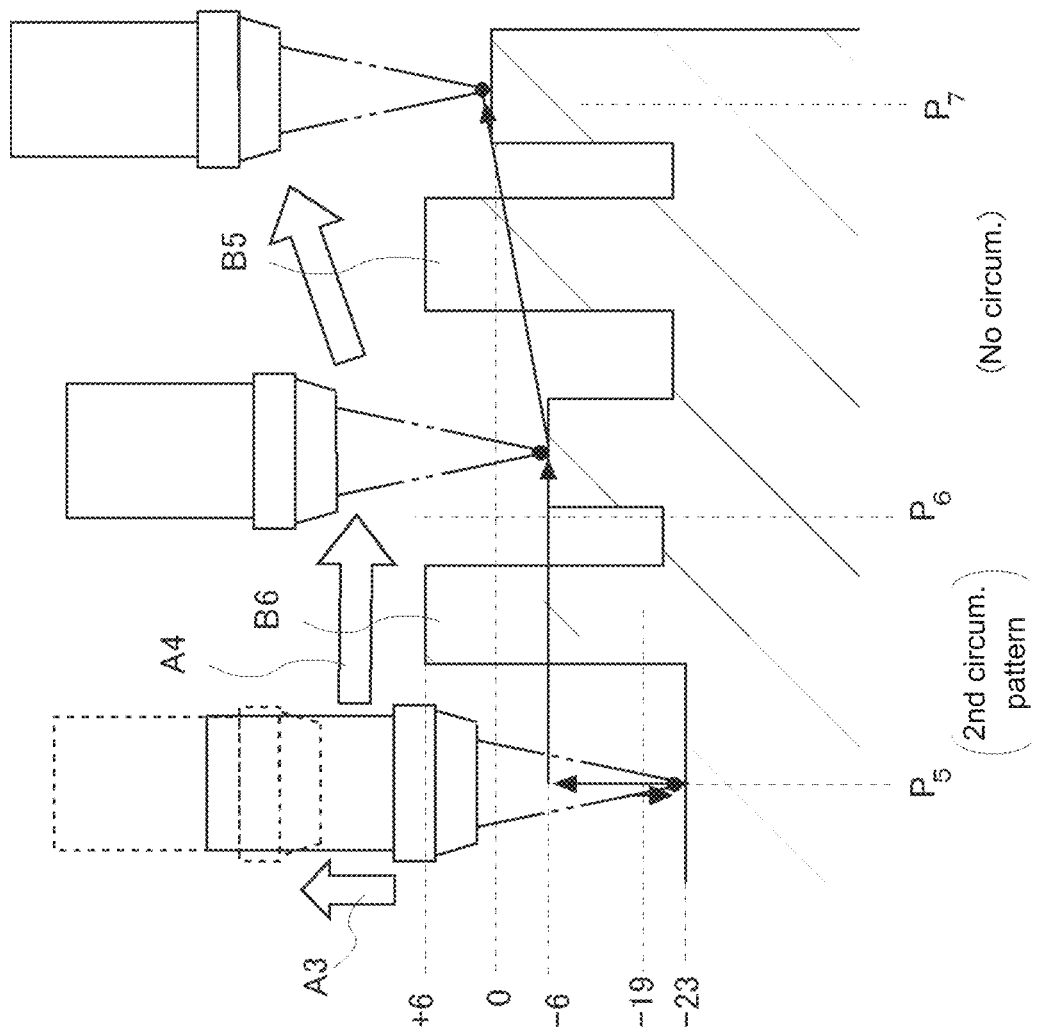
FIG. 15 is an enlarged diagram describing the displacement from a measurement point $P_5$ to a measurement point $P_6$.

Next, a case where the second circumvention pattern is applied is described. The displacement from the measurement point $P_5$ to the measurement point $P_6$ is considered as an example (FIGS. 7 and 15). FIG. 15 is an enlarged diagram describing the displacement from the measurement point $P_5$ to the measurement point $P_6$. Description focuses on the circumvention move command $P_6$ of the measurement condition (measurement procedure) in FIG. 8.

When the current height is obtained (ST110), the height of the measurement point $P_5$ is "−23." When the target point height is obtained (ST120), the height of the measurement point $P_6$ is "−6." The safety height is "−19," just as before (ST130).

First, in the flow chart in FIG. 11, the safety height (−19) is compared to the current height (−23) (ST140). The comparison shows that the current height (−23) is less than the safety height (−19) (ST140: NO). See FIG. 16 for the rest of the flow chart. Next, the target point height (−6) is compared to the safety height (−19) (ST210). The target point height (−6) is more than the safety height (−19) (ST210: YES).

Even though the target point height (−6) is higher than the safety height (−19) (ST210: YES), since the current height (−23) is lower than the safety height (−19) (ST140: NO), the camera 16 may touch the barrier (B5) before reaching the target point (measurement point $P_6$) when the camera 16 is displaced straight from the current position (measurement point $P_5$) to the target point (measurement point $P_6$).

Under the circumstance, in such a case, the part program generator 130 selects the circumvention path of the second circumvention pattern when the circumvention move command $P_6$ of the measurement condition is expanded into the part program. In other words, the part program generator 130 expands the circumvention move command into two move commands (see FIGS. 15 and 17). Specifically, the camera 16 is first raised to the height of the target point (measurement point $P_6$) along the vertical direction (ST220) (arrow A3 in FIG. 15) (move$P_{6-1}$ in FIG. 17). Since the current height (−23) is lower than the safety height (−19), the camera 16 may touch the barrier (B5) when displaced in a lateral direction without changing the height from the current height. Therefore, the camera 16 should first be displaced at least higher than the safety height (−19) by lifting up the camera 16 in the vertical direction (arrow A3 in FIG. 15). At this point, when the camera 16 is lifted up to the safety height (−19), the camera 16 can pass above the barrier B5 safely. But the height (−6) of the target point (measurement point $P_6$) is higher than the safety height (−19), and thus, it is reasonable to lift the camera 16 up to the target point height with one operation. Then, the camera 16 is displaced to the target point (measurement point $P_6$) with the horizontal displacement (ST230) (arrow A4 in FIG. 15) (move$P_{6-2}$ in FIG. 17).

In the case where the current height (−23) is lower than the safety height (−19) (ST140: NO) while the target point height (−6) is more than the safety height (−19) (ST210: YES), the path in which the camera 16 is lifted up to the target point height (ST220) and then displaced to the target point with the horizontal displacement (ST230) is the optimum path to secure safety.

Third Circumvention Pattern

Next, a case where the third circumvention pattern is applied is described. The displacement from the measurement point $P_3$ to the measurement point $P_4$ is considered as an example (FIGS. 7 and 18). FIG. 18 is an enlarged diagram describing the displacement from the measurement point $P_3$ to the measurement point $P_4$. The description focuses on the circumvention move command $P_4$ of the measurement condition (measurement procedure) in FIG. 8.

When the current height is obtained (ST110), the height of the measurement point $P_3$ is −23. When the target point height is obtained (ST120), the height of the measurement point $P_4$ is −33. The safety height is "−19," just as before (ST130).

When the safety height (−19) is compared to the current height (−23) and the target point height (−33), both are lower than the safety height (−19) (ST140: NO and ST210: NO). In this case, the camera 16 must be considered to pass above the barrier B3 safely. The part program generator 130 selects the circumvention path of the third circumvention pattern when expanding the circumvention move command of the measurement condition into the part program.

In other words, the part program generator 130 expands the circumvention move command into three move commands (see FIG. 19). See FIG. 16 for the flow chart. Specifically, the camera 16 is first raised to the safety height (−19) along the vertical direction (ST240) (arrow A5 in FIG. 18) (move$P_{4-1}$ in FIG. 19). When lifted to this height, the camera 16 is safe from making contact with the barrier B3.

Then, the camera 16 is displaced to the position immediately above the target point (measurement point $P_4$) with the horizontal displacement (ST250) (arrow A6 in FIG. 18) (move$P_{4-2}$ in FIG. 19). Further, the camera 16 is lowered to the target point along the vertical direction (ST260) (arrow A7 in FIG. 18) (move$P_{4-3}$ in FIG. 19). With this circumvention path, the camera 16 can be displaced to the target point safely.

In a case where the current height and the target point height are both lower than the safety height (ST140: NO and ST210: NO), the camera is first raised to the safety height to secure safety and then displaced to the target point. Accordingly, the camera can safely overcome the barrier to reach the target point.

Effects of the Invention

The following beneficial effects are achieved with the present embodiment.

(1) According to the present embodiment, even in a case where the circumvention path is defined in the off-line teaching such that the camera crosses over the barrier, the user only needs to enter the barrier height. When the barrier height is entered, the part program generator 130 automatically determines when the circumvention is necessary, and furthermore, automatically defines the circumvention path in which the camera crosses over the barrier safely at the required safety height. When the user has to define the circumvention path manually, the operation is very complicated. Calculating the safety height for each barrier, determining the necessity of circumvention by comparing the current height and the target height, and entering the proper circumvention paths one by one takes an excessive amount of time. Besides, when the user makes an error in calculation or makes a wrong entry, the camera and the work piece may be damaged. In this regard, according to the present embodiment, the user can properly define the circumvention path without notably increasing the burden on the user. Therefore, in a case where a work piece with relatively large unevenness is measured with the image measuring apparatus, the part program can be created simply, quickly, and safely.

(2) According to the present embodiment, the part program generator 130 obtains the safety height required for each barrier and automatically defines the optimum circumvention path. In this example, when the camera 16 is raised to a height sufficient for overcoming the barrier, the camera has no risk of coming into contact with the work piece. In extreme terms, when the camera 16 is raised to the highest point of a Z axis stroke, the camera 16 is definitely not going to touch the work piece W. However, measurement takes an unnecessarily long time when taking such a detour for overcoming every barrier, which results in extremely unfavorable measurement efficiency. In this regard, according to the present embodiment, the safety height is calculated based on the barrier height (ST130), and the most reasonable circumvention path safely clearing the safety height can be obtained. Therefore, it is possible to maintain favorable measurement efficiency.

(3) According to the present embodiment, when the image measuring apparatus is unable to execute the circumvention move command directly, the circumvention displacement can be achieved with the combination of existing move commands. A somewhat complex modification in design is necessary to create a new command with a motion controller of the image measuring apparatus 1 in order to realize the circumvention displacement. However, when the measurement condition (measurement procedure) is converted to the combination of existing move commands at the stage where the measurement condition (measurement procedure) is expanded into the part program, as in the present embodiment, modification of the image measuring apparatus itself is not necessary. Therefore, the execution of the present embodiment requires only minimal additional cost.

First Modification

Figure 20:
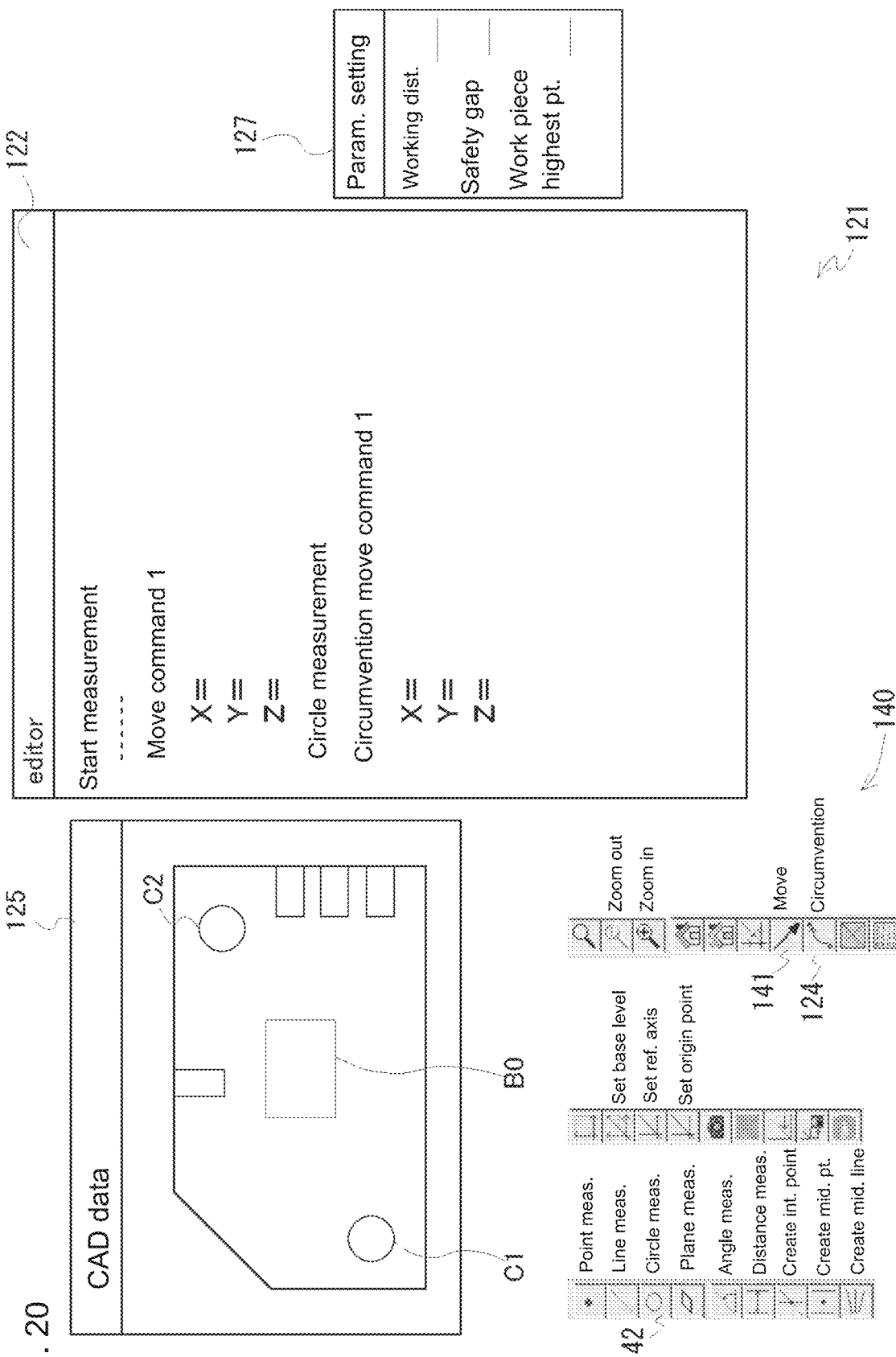
FIG. 20 illustrates an exemplary GUI screen provided to the user.

In the first embodiment above, the barrier height has to be entered for each circumvention move command. As a first modification, the input of the barrier height may not be requested every time. A method of doing this is considered in which the highest point of the work piece is entered in advance, for example. As shown in FIG. 20, for example, the highest point of the work piece is entered as one item in the parameter settings. In the process of the circumvention move command, the highest point of the work piece is the barrier height.

When the circumvention path is defined using the highest point of the work piece as the barrier height, it is obvious that the circumvention path is absolutely safe. The user does not have to enter the barrier height every time and therefore, the setting of measurement conditions becomes extremely simple. However, when creating the circumvention path in this way, the camera needs to be raised to the height safely overcoming the highest point of the work piece each time.

This means that the camera detours more than necessary and the measurement time takes that much longer. Yet, there may be an issue where more time is wasted in entering the measurement conditions than in the measurement time itself. For example, when measuring sample goods and a small number of goods. Continuously measuring hundreds, thousands, and tens of thousands of work pieces having the same shape is a different matter. However, in a case where sample goods or a small number of goods are measured, a little detour is not an issue and the simplicity of the entry work is preferred.

Second Modification

Figure 21:
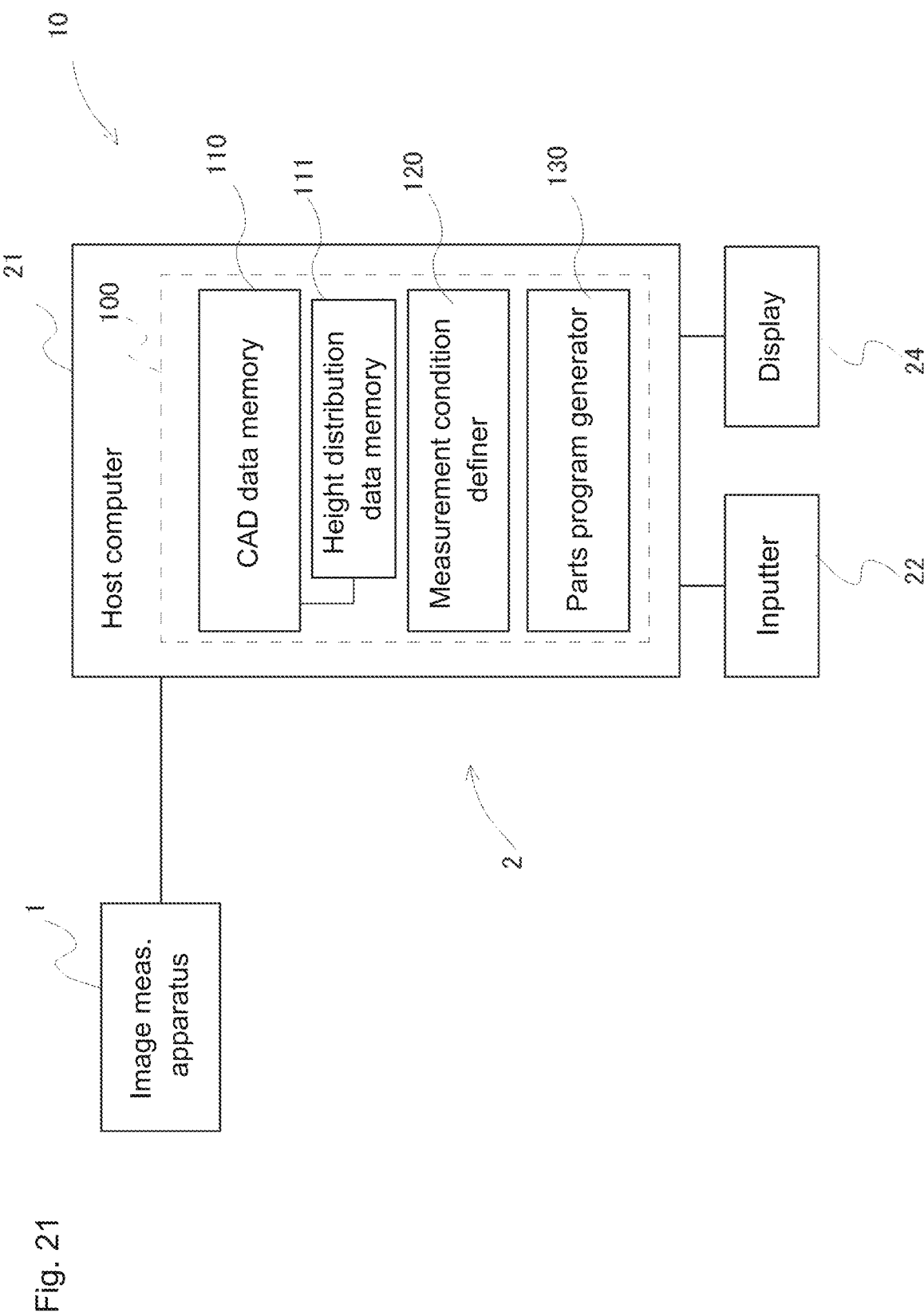
FIG. 21 is a functional block diagram of the part program generating device.

As a second method in which the input of the barrier height is not required every time, the height data, in addition to two-dimensional CAD data, is entered ahead of time in the host computer. In FIG. 21, a height distribution data memory 111 is attached to the CAD data memory 110. For example, in FIG. 22, the plan view of the work piece is displayed in the CAD data window 125 and distinctively tinted by hatching. The tinting is performed ahead of time by the user after reading the CAD data. In this example, the user designates each range and enters the height respectively. Using graphics processing of the host computer, for example, a height difference is displayed by changing density of the hatching based on the height. Of course, the display can also be distinguished using different colors. Alternatively, CAD data which is distinctively tinted ahead of time may be read. As a user aid, when a mouse cursor is positioned in each region inside the CAD data window 125, the defined height may be displayed in a pop-up, a status bar, or the like. Alternatively, when the user drags a top end, a bottom end, or a whole space of a range indicator 172 of a height scale 171 using the mouse and specifies a desired range, only the region of the desired height range (e.g. 9 mm-10 mm) may be colored so as to stand out and the other regions fade out. Although the user specifies the range, the user may specify the range by drawing a shape or the computer may automatically recognize the region surrounded by a contour line of the CAD data using the graphic processing function of the host computer.

When tinting distinctively by height, the regions may overlap. For example, after defining the height of the widest flat surface Wp of the work piece, there is a case where the height of the projection B0 (the barrier) is defined inside the flat surface Wp. That is, two values are defined in the projection B0. When two values are defined because the regions overlap in this way, it is necessary to make rules for which value has priority.

A first idea is to prioritize the height which is defined and input later. The height of the projection B0 defined and input later has the priority. In general, since a region having a projection or a hole portion is selected later, the rule mentioned above is considered sufficiently useful. Naturally, the user may be able to selectively change the priority every time between the value entered ahead of time or the value entered later. A second idea is to prioritize the height defined and input in an included area or narrow area. In general, approximate settings are made for broad areas, then these settings are modified locally, and therefore, this rule is considered sufficiently useful. Naturally, the user may be able to selectively change the priority every time between the value in the included area and the value in the narrow area.

While defining and entering the measurement conditions in the editing window 122, when the user issues a command for the circumvention displacement, the measurement condition definer 120 automatically defines the highest point on the path as the barrier height based on the current position and the target position. Accordingly, the user no longer needs to enter the barrier heights individually during the editing of the measurement conditions.

Instead of the measurement condition definer 120 reading the highest point on the path from the height data, the part program generator 130 may read the highest point on the path from the height data when expanding to the part program.

Third Modification

When expanding the measurement condition defined by the measurement condition definer 120 to the part program language, as shown in FIG. 23, the circumvention move command may be incorporated in the part program as a subroutine 161. In this example, the subroutine 161 generates the circumvention displacement path in the order described in FIGS. 11, 12, and 16 and displaces the camera using the displacement path. When converting to the part program, each circumvention move command in the measurement procedure has destination coordinates (X, Y, Z) and a barrier height $H_B$ as real arguments, and is converted to a call command calling the subroutine 161. When running the part program, each of the call commands calls the subroutine 161, generates the circumvention displacement path based on the real arguments, and executes the displacement.

Fourth Modification

Figure 24:
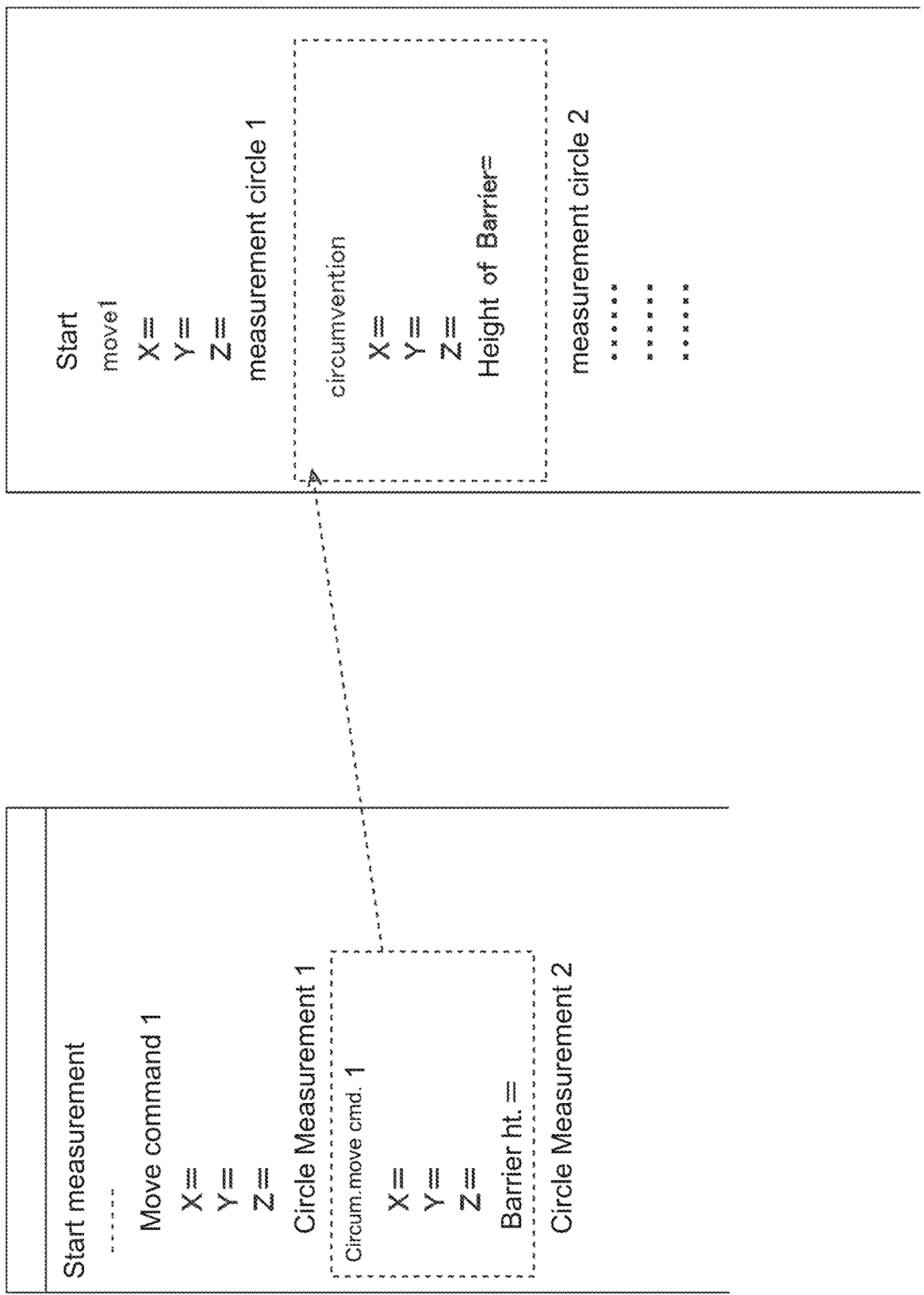
FIG. 24 illustrates an exemplary case where the measurement procedure is converted to the part program language.

The first embodiment mentioned above is explained under the presumption that the image measuring apparatus 1 is unable to execute the "circumvention move command" directly. Naturally, the image measuring apparatus (in other words, the motion controller of the image measuring apparatus) may instead be able to perform the "circumvention move command" directly. A single command of the part program language corresponding to the circumvention move command is prepared. Then, as shown in FIG. 24, the circumvention move command is compiled in the corresponding part program language. Essentially, when executing the part program, the image measuring apparatus (the motion controller of the image measuring apparatus) may execute the circumvention move command using the steps in the flowcharts in FIGS. 11, 12, and 16. In this case, the image measuring apparatus (the motion controller of the image measuring apparatus) has a built-in "control device."

Furthermore, the image measuring apparatus may include functions of setting and modifying parameters (working distance of the camera and the safety gap), setting and modifying the barrier height parameter of the circumvention move command, and loading and utilizing height distribution data (such as files). A function supporting creation of the height distribution data (such as files) may be included in the host computer.

Fifth Modification

In the description to this point, the camera 16 goes "direct" from the start point to the target point in a straight line. However, the relative displacement of the camera 16 and the measurement table 13 is realized by the cooperation of the three drive axes of the X-axis, Y-axis, and Z-axis.

Therefore, the camera 16 is not limited to moving directly from the start point to the target point in a straight line.

Figure 25:
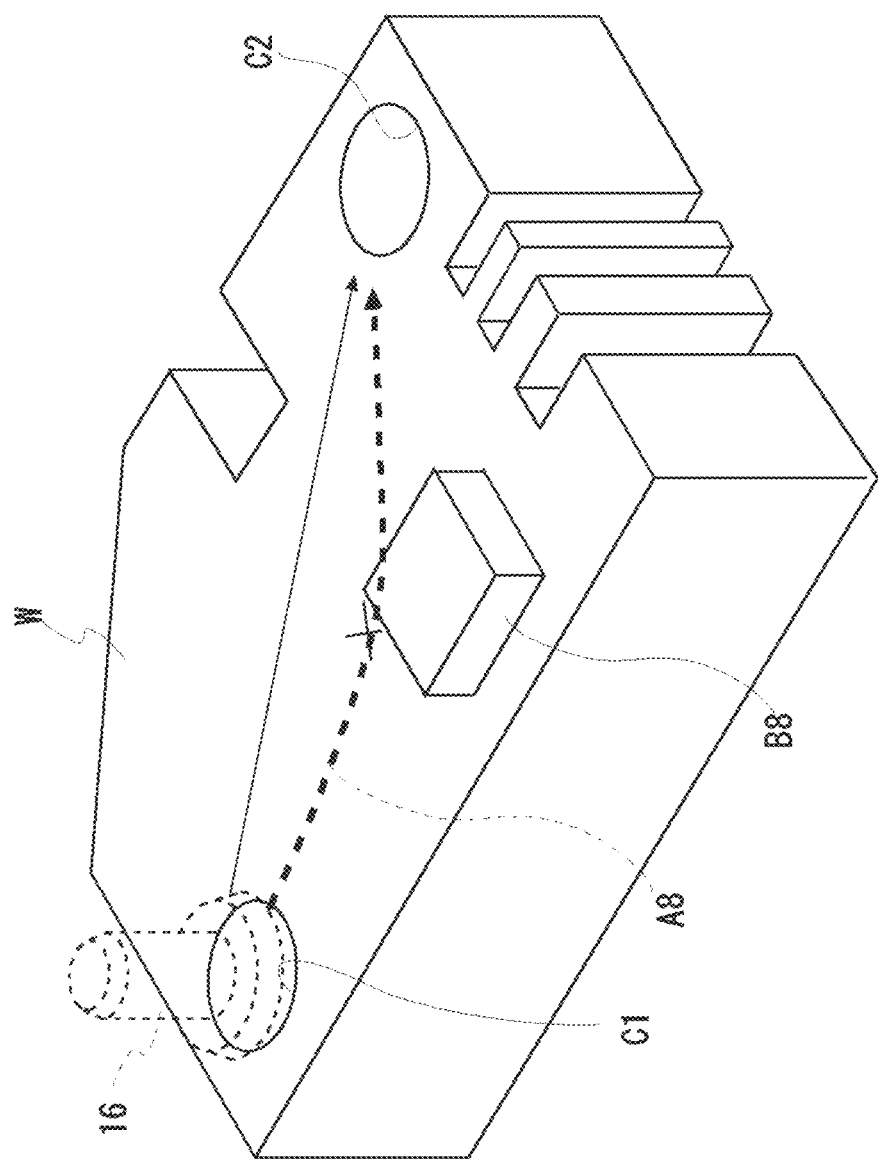
FIG. 25 illustrates an exemplary case where the camera is displaced.

For example, a case in FIG. 25 is considered. In the work piece in FIG. 25, a barrier B8 is positioned slightly shifted from a straight line connecting the circle C1 and the circle C2. After measuring the circle C1, when the camera 16 goes directly toward the circle C2 in a straight line, the camera 16 does not contact the barrier B8. However, when the Y drive axis and X drive axis aim at the target point independently without harmonious cooperation from each of the drive axes, the displacement path of the camera 16 is not straight (see a dotted line A8 in FIG. 25 for example). In this case, in spite of the barrier B8 being positioned slightly shifted from the straight line connecting the circle C1 and the circle C2, the camera 16 may come into contact with the barrier B8 when the position of the camera 16 is lower than the barrier B8. Therefore, only considering barriers lying on the straight path from the start point to the target point is not enough when considering the barriers during the displacement of the camera 16 from the start point to the target point.

Figure 26:
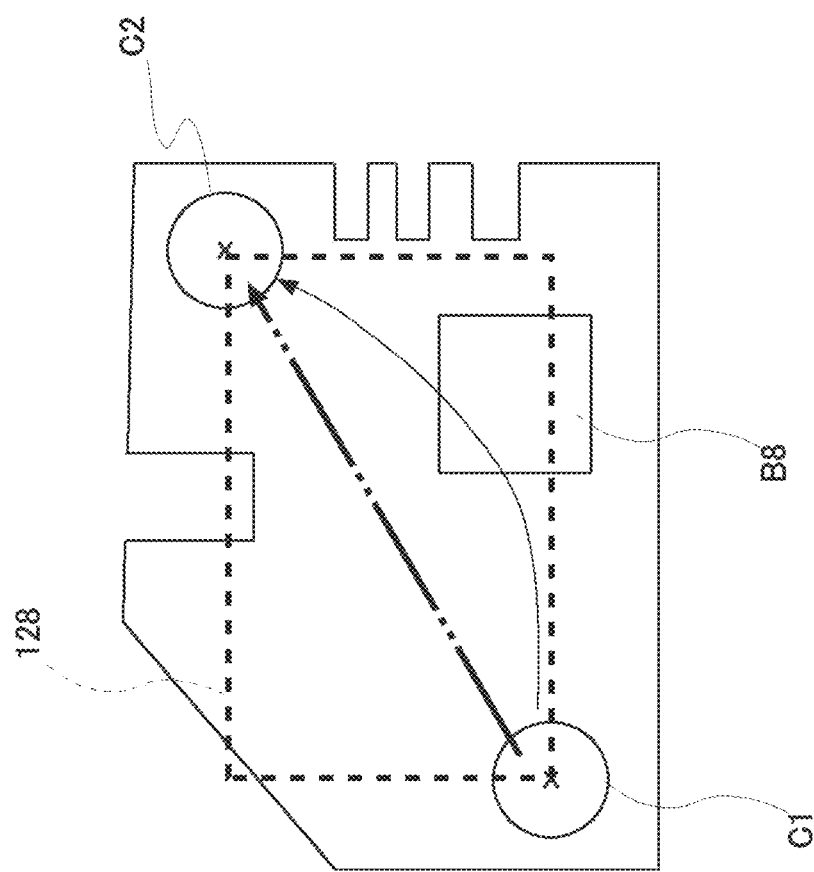
FIG. 26 illustrates an exemplary case where the camera is displaced.

Given this, shifting the displacement path of the camera 16 from a straight line is also taken into consideration. No matter how much the displacement path of the camera 16 is shifted from the straight line, all the displacement paths are included in a rectangle having sides parallel to the drive axes and with the start point and the target point in opposing corners. See FIG. 26, for example. Therefore, when the user enters the barrier height, preferably, the highest point of the barrier included in the rectangle with the start point and the target point in opposing corners is entered as the barrier height.

In addition, when the measurement condition definer 120 or the part program generator 130 automatically obtains the barrier height, the highest point of the barrier included in the rectangle with the start point and the target point in opposing corners is defined as the barrier height.

According to this configuration, even when the camera is independently controlled without the cooperation of the camera drive axes, the image measurement is performed on a path overcoming the barrier properly. The description above is a two-dimensional description of the plan view (FIG. 26), but safety is secure even in three dimensions. No matter how much the displacement path of the camera 16 is shifted from the straight line, the displacement path is included in a rectangular parallelepiped having sides parallel to the drive axis and with the start point and the target point in opposing corners. However, the vertical displacement path of the camera is parallel to the Z axis without bending. Therefore, when using the path where the camera is raised to the safety height at the start point and lowered toward the target point when the camera is placed immediately above the target point, the camera safely overcomes the barrier within the rectangular parallelepiped and safety is inevitably secured.

Sixth Modification

A sixth modification is now described. In the first embodiment above, the first circumvention pattern and the second circumvention pattern are described. In the first circumvention pattern and the second circumvention pattern, when one of the current height and the target point height is lower than the safety height, the camera passes over the barrier with the horizontal displacement. The circumvention system executes the part program with a step execution or a displacement speed control mode and since the displacement at right angles is easy to understand when visually confirming the displacement path for purposes of interference checking and the like, the system provides a sense of security. In addition, there is an advantage that since the camera passes over the barrier with enough of a margin (safety gap), the camera reliably passes over the barrier even when there are some mistakes in settings or control instability. However, the circumvention path becomes longer and takes a correspondingly longer time. Therefore, the sixth modification as described allows the displacement time to be a little shorter by utilizing diagonal displacement within a range where safety can be secured.

Figure 27:
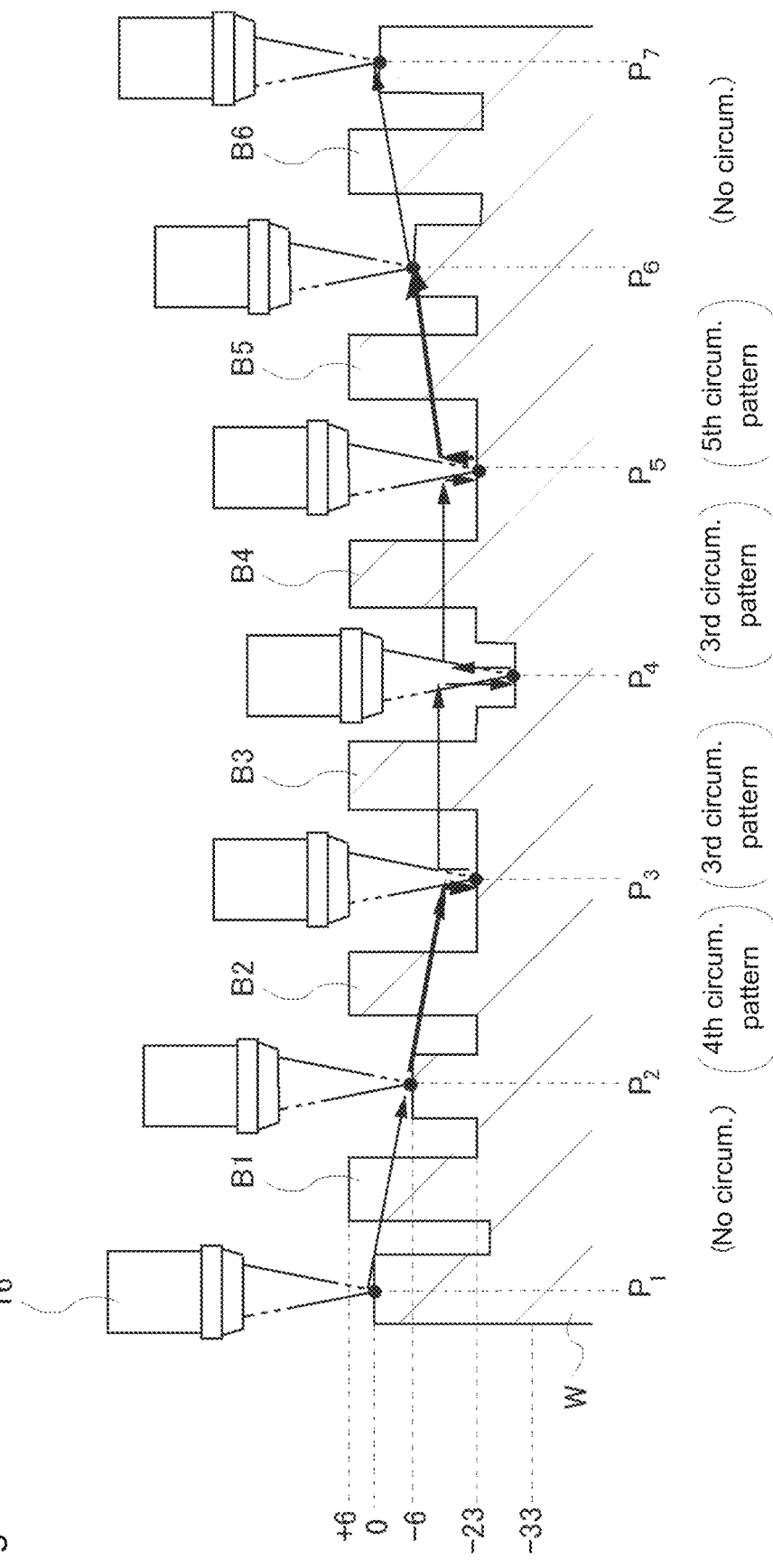
FIG. 27 schematically illustrates a fourth circumvention pattern and a fifth circumvention pattern in a modification.
Figure 28:
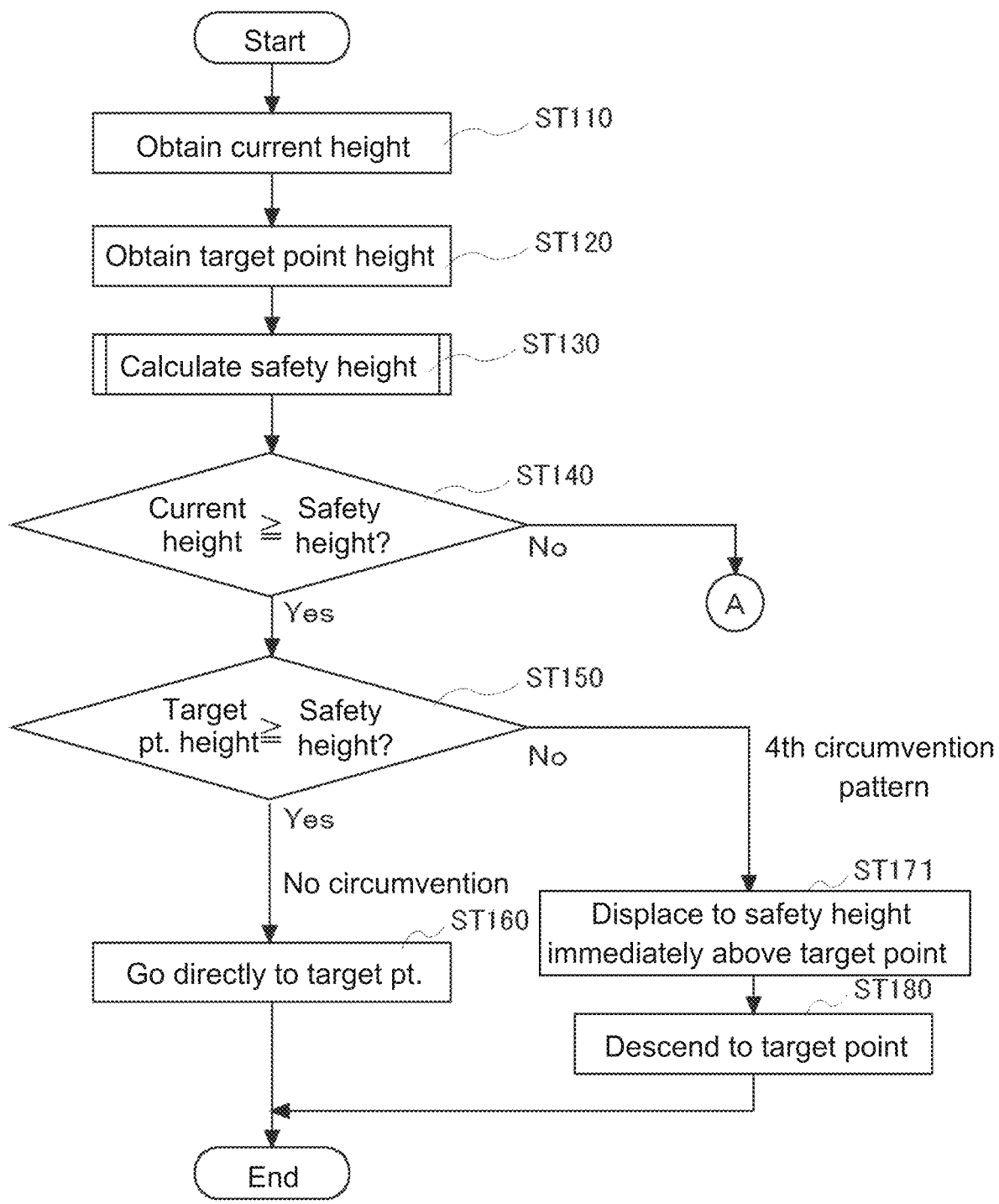
FIG. 28 is a flow chart describing the fourth circumvention pattern in the modification.

Referring to FIG. 27, FIG. 27 corresponds to FIG. 7 and a fourth circumvention pattern is used instead of the first circumvention pattern and a fifth circumvention pattern is used instead of the second circumvention pattern. The fourth circumvention pattern is described with reference to FIGS. 28 and 29. In the flowchart in FIG. 28, when the target point height is less than the safety height (ST150: NO), the circumvention is necessary since the camera is unable to go directly to the target point. At this point in time, in the fourth circumvention pattern, the camera is displaced to the safety height immediately above the target point instead of being displaced to the position immediately above the target point with the "horizontal displacement" (ST171). When comparing FIG. 29 with FIG. 14, in a first step of displacement (moveP$_{3-1}$), the camera 16 is displaced toward Z=−19 instead of in the horizontal displacement maintaining the current height (Z=−6). Then, after reaching the safety height immediately above the target point, the camera 16 is lowered toward the target point (ST180). When the camera 16 is at or higher than the safety height, it is safe no matter how the camera 16 is displaced and therefore, safety is positively secured even when the camera 16 goes directly to the safety height immediately above the target point by moving diagonally. Therefore, the path becomes shorter and the displacement time is shortened accordingly.

Figure 30:
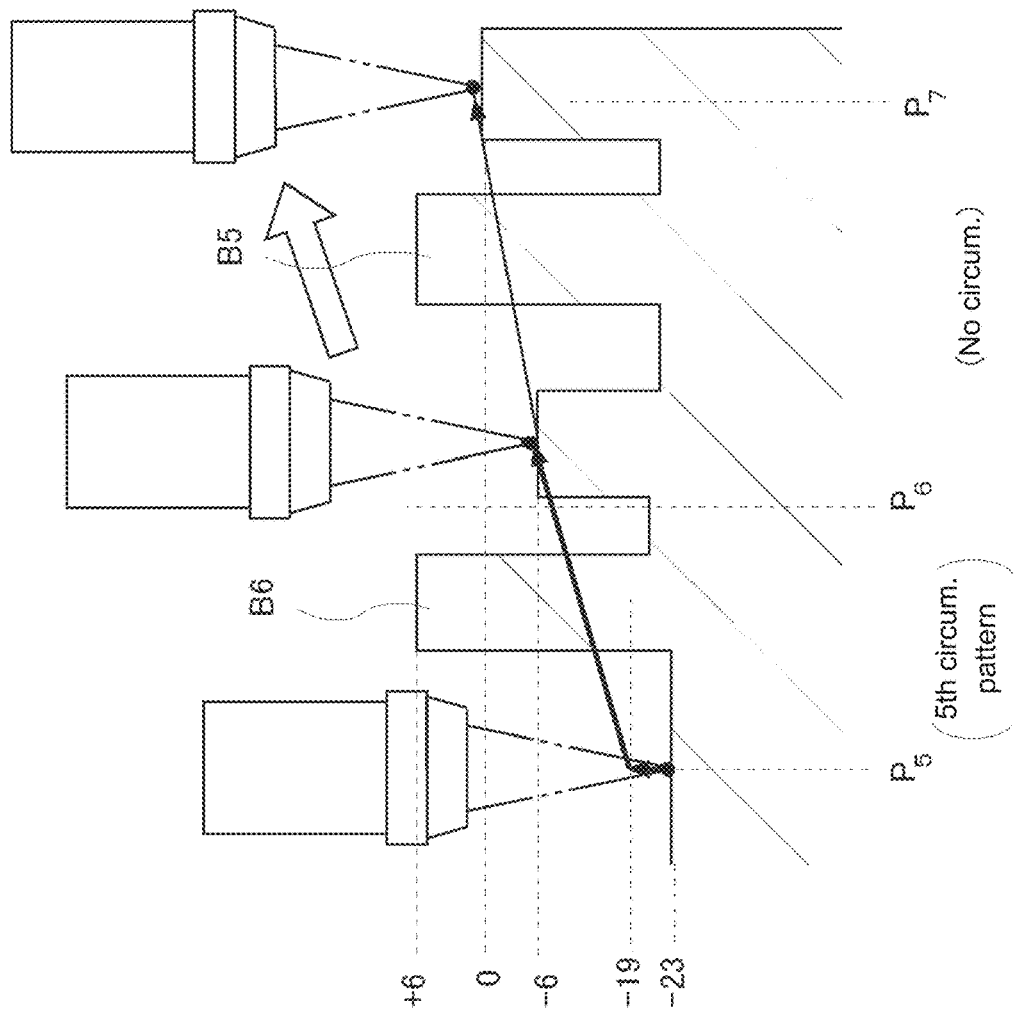
FIG. 30 schematically illustrates the fifth circumvention pattern in the modification.
Figure 31:
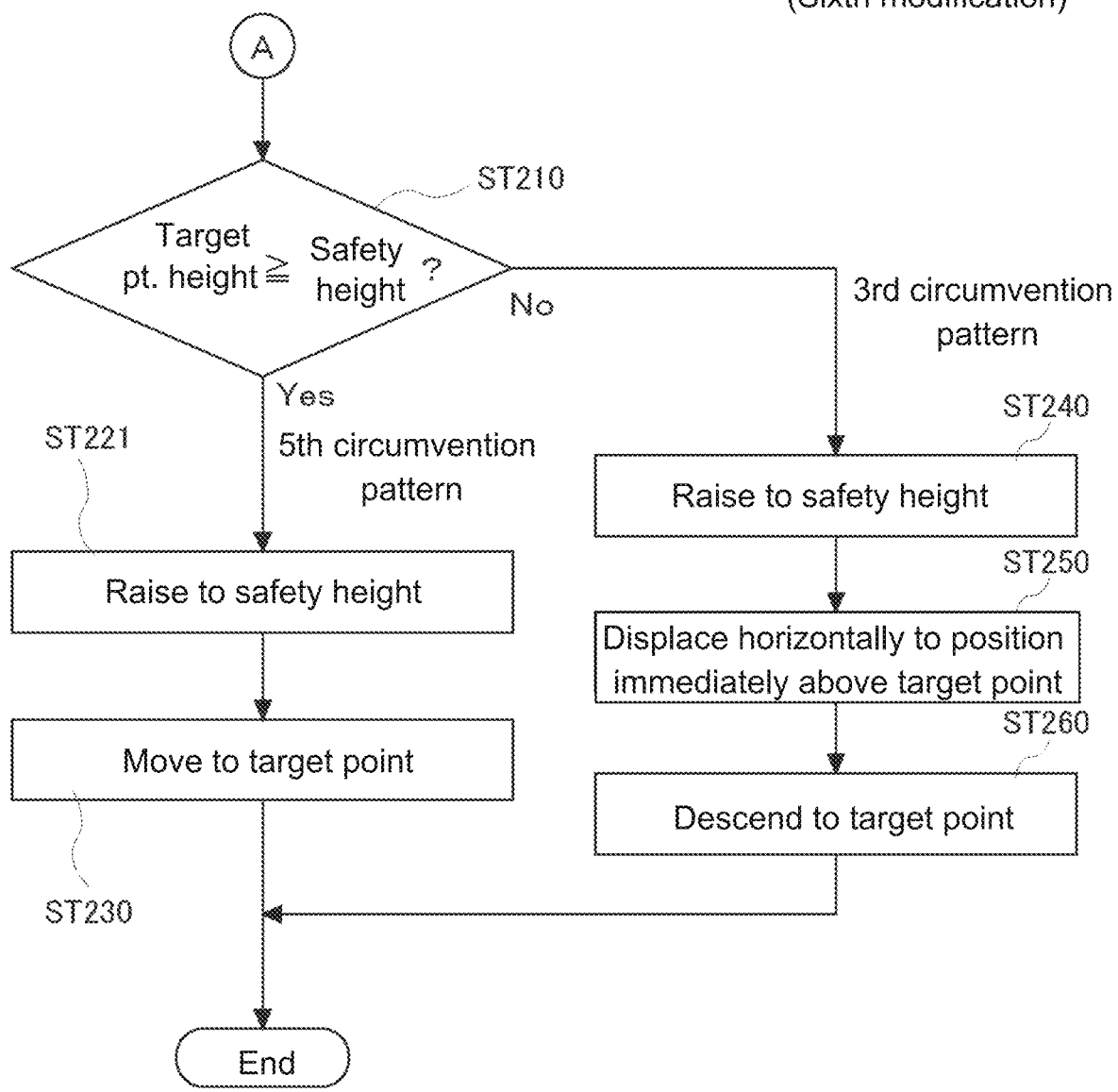
FIG. 31 is a flow chart describing the fifth circumvention pattern in the modification.

Next, the fifth circumvention pattern is described with reference to FIGS. 30, 31, and 32. In the flowcharts in FIGS. 28 and 31, when the target point height is at or higher than the safety height (ST210: YES), but the current height is less than the safety height (ST140: NO), the circumvention is necessary since the camera 16 is unable to go directly to the target point. At this point in time, in the fifth circumvention pattern, the camera 16 is not raised to the height of the target point all at once, but instead the camera 16 is kept raised up to the safety height (−19) (ST221). When comparing FIG. 32 with FIG. 17, the camera 16 is not raised to the target point height (Z=−6) in the first step of displacement (moveP$_{6-1}$), but instead is kept raised up to the safety height (−19) (ST221), then is displaced to go directly to the target point (ST230). When the height of the camera 16 is raised to the safety height, the camera 16 is safe no matter how the camera 16 is displaced, and therefore, safety is positively secured even when the camera 16 goes directly to the target point by moving diagonally. Therefore, the path becomes shorter and the displacement time is shortened accordingly.

Seventh Modification

Figure 33:
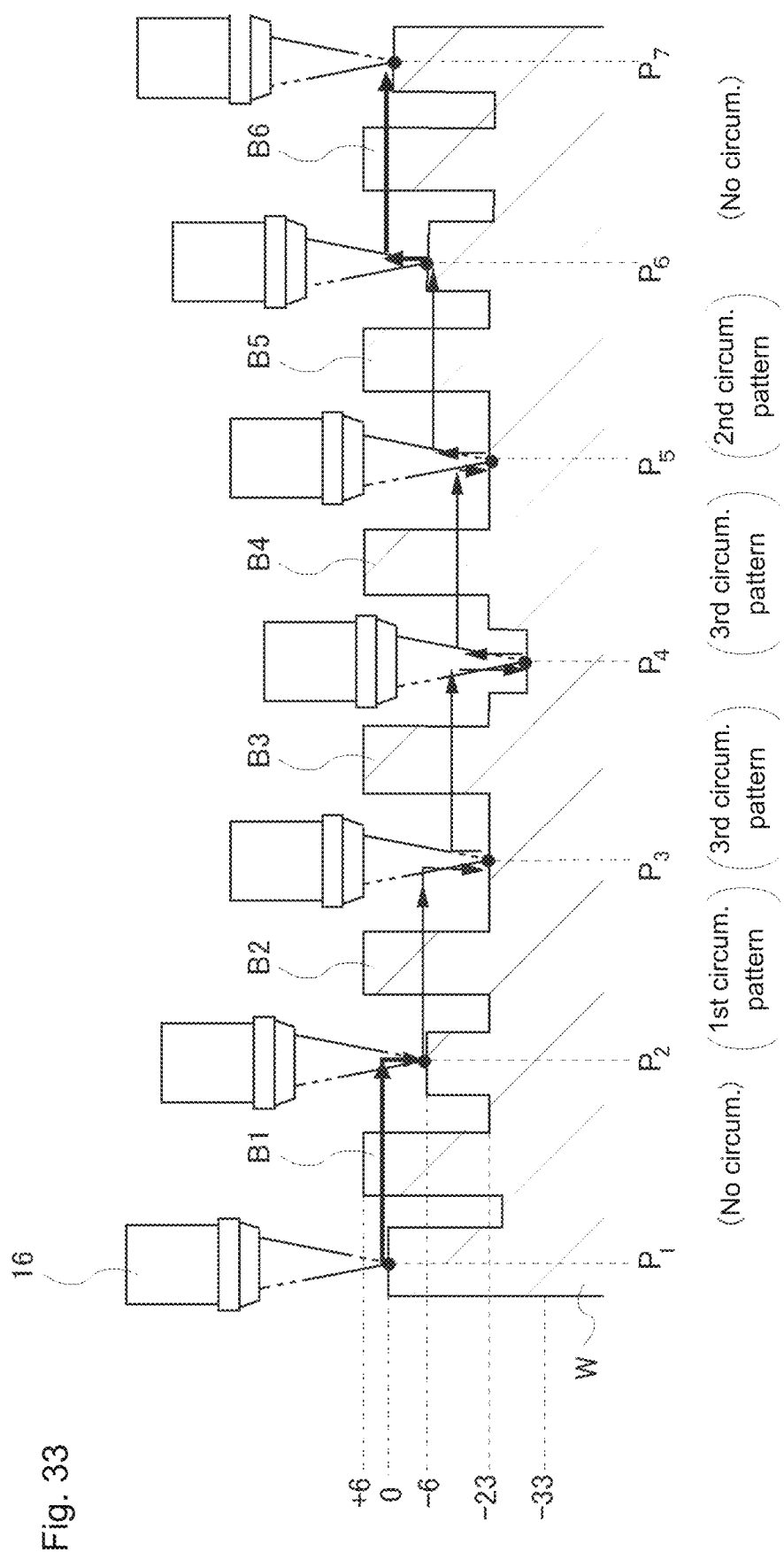
FIG. 33 schematically illustrates another modification.

Visual understanding is facilitated when the displacement of the camera 16 is at right angles, and therefore, all the displacement paths can be configured with vertical direction displacement and horizontal displacement. For example, in FIG. 7, circumvention is unnecessary for the displacements from the point P$_1$ to the point P$_2$ and from the point P$_6$ to the point P$_7$, and therefore, the camera 16 goes directly to the target point by moving diagonally. However, as shown in FIG. 33, the camera 16 may be raised (or lowered) at first and then displaced horizontally. Of course, it is also possible to change the order and let the camera 16 be raised (or lowered) after performing the horizontal displacement.

Moreover, the present invention is not limited to the embodiment described above, and may be modified as needed without departing from the scope of the present invention. In the descriptions, the image measuring apparatus is exemplified as the surface texture measuring apparatus, however a scope of the present invention can be widely applied to measuring apparatuses measuring a work piece with a non-contact type sensor. For example, form measuring apparatuses are known in which a shape and a height (profile) of the work piece is measured with the non-contact type sensor. The sensor may have detection methods such as a photoelectric type and a capacitance type. For the photoelectric type, laser ranging may be used, but in addition, a chromatic point sensor (CPS) or a WLI (White Light Interferometer) measurement principle (white light interferometry) disclosed in Japanese Patent No. 5190330 are also known, for example. Alternatively, a sensor measuring color, gloss, film thickness, and the like can be used. A direction of approach of the sensor to the work piece can be applied to a measuring apparatus facing upward or sideways.

In the description above, CAD data of the work piece is stored in the CAD data memory and the CAD data of the work piece is displayed in the CAD data window as a user aid. In the off-line teaching, there is a method in which a photo of the work piece is used instead of the CAD data, for example. In other words, the image data of the work piece captured in the plan view is stored in the data memory and the picture data of the work piece may be displayed in the data window as a user aid. In this case, an image of the work piece may be captured by the measuring apparatus itself at a long working distance by a wide visual field lens ahead of time. When capturing the image, the user may avoid a collision with manual operation. When using a long working distance field lens, the manual operation is not difficult. In addition, stitching (patching) of a plurality of photos may be performed.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A part program generating device for part programs being a control program of a surface texture measuring apparatus having a sensor that performs non-contact measurement of a work piece, configured to measure a shape of the work piece while relatively displacing the sensor and the work piece, the part program generating device comprising:

a measurement condition definer configured to receive an input operation performed by a user, the measurement condition definer further configured to define a measurement procedure; and a part program generator configured to convert the measurement procedure defined by the measurement condition definer into a part program language, wherein:
the measurement condition definer is further configured to provide the user with, as a user interface:
an editor configured to edit the measurement procedure in an editing language, and
a set of commands in the editing language used to define the measurement procedure, and
the set of commands in the editing language includes a measurement command, the measurement command configured to instruct the apparatus to measure the work piece, and a circumvention move command, the circumvention move command configured to instruct the apparatus, after stopping measurement of the work piece, to vertically overcome a barrier when the sensor is displaced from a first measurement point as a start point to a second measurement point as a target point.

2. The part program generating device according to claim 1, wherein:
the circumvention move command includes a parameter of a barrier height, and
when the circumvention move command is selected by the user, the measurement condition definer prompts the user to enter the barrier height.

3. The part program generating device according to claim 1, wherein:
the user interface is configured to accept user input of a highest point height of the work piece, and
when the user selects the circumvention move command icon, one of the measurement condition definer and the part program generator automatically defines the highest point height as the barrier height in displacing from the first measurement point to the second measurement point.

4. The part program generating device according to claim 1, further comprising a height distribution data memory configured to store height distribution data of the work piece.

5. The part program generating device according to claim 1, wherein the part program generator is further configured to:
obtain coordinate values of the first measurement point and coordinate values of the second measurement point;
obtain height data of the barrier, which is a projection or step on the work piece;
configures a safety gap to be secured between the sensor and the barrier when displacing the sensor above the barrier;
calculate a safety height required for the sensor to:
overcome the barrier based on the barrier height,
a working distance of the sensor, and
the safety gap; and
find a safety path passing at least at the safety height above the barrier on the path from the first measurement point to the second measurement point based on:
the coordinate values of the first measurement point,
the coordinate values of the second measurement point, and
the safety height.

6. The part program generating device according to claim 2, wherein the part program generator is further configured to:
obtain coordinate values of the first measurement point and coordinate values of the second measurement point;
obtain height data of the barrier, which is a projection or step on the work piece;
configures a safety gap to be secured between the sensor and the barrier when displacing the sensor above the barrier;
calculate a safety height required for the sensor to:
overcome the barrier based on the barrier height,
a working distance of the sensor, and
the safety gap; and
find a safety path passing at least at the safety height above the barrier on the path from the first measurement point to the second measurement point based on:
the coordinate values of the first measurement point,
the coordinate values of the second measurement point, and
the safety height.

7. The part program generating device according to claim 3, wherein the part program generator is further configured to:
obtain coordinate values of the first measurement point and coordinate values of the second measurement point;
obtain height data of the barrier, which is a projection or step on the work piece;
configures a safety gap to be secured between the sensor and the barrier when displacing the sensor above the barrier;
calculate a safety height required for the sensor to:
overcome the barrier based on the barrier height,
a working distance of the sensor, and
the safety gap; and
find a safety path passing at least at the safety height above the barrier on the path from the first measurement point to the second measurement point based on:
the coordinate values of the first measurement point,
the coordinate values of the second measurement point, and
the safety height.

8. The part program generating device according to claim 4, wherein the part program generator is further configured to:
obtain coordinate values of the first measurement point and coordinate values of the second measurement point;
obtain height data of the barrier, which is a projection or step on the work piece;
configures a safety gap to be secured between the sensor and the barrier when displacing the sensor above the barrier;
calculate a safety height required for the sensor to:
overcome the barrier based on the barrier height,
a working distance of the sensor, and
the safety gap; and
find a safety path passing at least at the safety height above the barrier on the path from the first measurement point to the second measurement point based on:
the coordinate values of the first measurement point,
the coordinate values of the second measurement point, and
the safety height.

9. A part program generating device for part programs being a control program of a surface texture measuring apparatus having a sensor that performs non-contact measurement of a work piece, configured to measure a shape of the work piece while relatively displacing the sensor and the work piece, the part program generating device comprising:
a processor; and
a memory that stores an instruction,
the part program generating device further comprising, as a configuration when the processor executes the instruction stored in the memory:
a measurement condition definer configured to receive an input operation performed by a user, the measurement condition definer further configured to define a measurement procedure; and
a part program generator configured to convert the measurement procedure defined by the measurement condition definer into a part program language,
wherein:
the measurement condition definer is further configured to provide the user with, as a user interface:
an editor configured to edit the measurement procedure in an editing language, and
a set of commands in the editing language used to define the measurement procedure, and
the set of commands in the editing language includes a measurement command, the measurement command configured to instruct the apparatus to measure the work piece, and a circumvention move command, the circumvention move command configured to instruct the apparatus, after stopping measurement of the work piece, to vertically overcome an obstacle when the sensor is displaced from a first measurement point as a start point to a second measurement point as a target point.

10. The part program generating device according to claim 9, wherein:
the circumvention move command includes a parameter of a barrier height, and
when the circumvention move command is selected by the user, the measurement condition definer prompts the user to enter the barrier height.

11. The part program generating device according to claim 9, wherein:
the user interface is configured to accept user input of a highest point height of the work piece, and
when the user selects the circumvention move command icon, one of the measurement condition definer and the part program generator automatically defines the highest point height as the barrier height in displacing from the first measurement point to the second measurement point.

12. The part program generating device according to claim 9, further comprising, as a configuration when the processor executes the instruction stored in the memory, a height distribution data memory configured to store height distribution data of the work piece.

13. The part program generating device according to claim 9, wherein the part program generator is further configured to:
obtain coordinate values of the first measurement point and coordinate values of the second measurement point;
obtain height data of the barrier, which is a projection or step on the work piece;

configures a safety gap to be secured between the sensor and the barrier when displacing the sensor above the barrier;
calculate a safety height required for the sensor to:
overcome the barrier based on the barrier height,
a working distance of the sensor, and
the safety gap; and
find a safety path passing at least at the safety height above the barrier on the path from the first measurement point to the second measurement point based on:
the coordinate values of the first measurement point,
the coordinate values of the second measurement point, and
the safety height.

14. The part program generating device according to claim 10, wherein the part program generator is further configured to:
obtain coordinate values of the first measurement point and coordinate values of the second measurement point;
obtain height data of the barrier, which is a projection or step on the work piece;
configures a safety gap to be secured between the sensor and the barrier when displacing the sensor above the barrier;
calculate a safety height required for the sensor to:
overcome the barrier based on the barrier height,
a working distance of the sensor, and
the safety gap; and
find a safety path passing at least at the safety height above the barrier on the path from the first measurement point to the second measurement point based on:
the coordinate values of the first measurement point,
the coordinate values of the second measurement point, and
the safety height.

15. The part program generating device according to claim 11, wherein the part program generator is further configured to:
obtain coordinate values of the first measurement point and coordinate values of the second measurement point;
obtain height data of the barrier, which is a projection or step on the work piece;
configures a safety gap to be secured between the sensor and the barrier when displacing the sensor above the barrier;
calculate a safety height required for the sensor to:
overcome the barrier based on the barrier height,
a working distance of the sensor, and
the safety gap; and
find a safety path passing at least at the safety height above the barrier on the path from the first measurement point to the second measurement point based on:
the coordinate values of the first measurement point,
the coordinate values of the second measurement point, and
the safety height.

16. The part program generating device according to claim 12, wherein the part program generator is further configured to:
obtain coordinate values of the first measurement point and coordinate values of the second measurement point;
obtain height data of the barrier, which is a projection or step on the work piece;
configures a safety gap to be secured between the sensor and the barrier when displacing the sensor above the barrier;
calculate a safety height required for the sensor to:
overcome the barrier based on the barrier height,
a working distance of the sensor, and
the safety gap; and
find a safety path passing at least at the safety height above the barrier on the path from the first measurement point to the second measurement point based on:
the coordinate values of the first measurement point,
the coordinate values of the second measurement point, and
the safety height.

* * * * *